(12) United States Patent
Brown et al.

(10) Patent No.: US 9,388,570 B2
(45) Date of Patent: Jul. 12, 2016

(54) EXTENDABLE SLEEVE FOR POURED CONCRETE DECK

(71) Applicant: Securus, Inc., San Diego, CA (US)

(72) Inventors: Larry D. Brown, San Diego, CA (US); Virgil O'Neil, San Diego, CA (US); Timothy M. McConnell, San Diego, CA (US); Dennis L. Hart, Incline Village, NV (US); Darrell W. Price, Rockledge, FL (US)

(73) Assignee: Securus, Inc., Poway, CA (US)

( * ) Notice: Subject to any disclaimer, the term of this patent is extended or adjusted under 35 U.S.C. 154(b) by 0 days.

(21) Appl. No.: 14/484,747

(22) Filed: Sep. 12, 2014

(65) Prior Publication Data
US 2015/0204088 A1    Jul. 23, 2015

Related U.S. Application Data

(62) Division of application No. 13/840,003, filed on Mar. 15, 2013, now Pat. No. 9,086,174.

(51) Int. Cl.
*E04C 2/52*    (2006.01)
*E04B 1/94*    (2006.01)
(Continued)

(52) U.S. Cl.
CPC .............. *E04B 1/947* (2013.01); *A62C 2/065* (2013.01); *E04B 1/948* (2013.01); *E04G 15/061* (2013.01); *F16L 5/02* (2013.01); *F16L 5/04* (2013.01); *H02G 3/22* (2013.01); *H02G 3/0412* (2013.01)

(58) Field of Classification Search
CPC .............. B28B 7/30; B28B 7/18; B28B 7/02; B28B 7/16; B28B 21/88; B28B 21/74; B28B 7/0079; B28B 21/82; B29C 33/0033; B29C 44/583; B29C 9/24; E04B 1/947; E04B 1/948; F16L 5/04; F16L 5/02; H02G 3/22; H02G 3/0412

USPC .......... 52/220.8, 576; 249/142, 177, 39, 152, 249/175, 43, 63, 64; 285/298–303
See application file for complete search history.

(56) References Cited

U.S. PATENT DOCUMENTS

| | | |
|---|---|---|
| 750,632 A | 1/1904 | Fisher |
| 825,810 A | 7/1906 | Cooke |

(Continued)

FOREIGN PATENT DOCUMENTS

| | | |
|---|---|---|
| CA | 2174199 | 12/1996 |
| CA | 2411094 | 5/2003 |

(Continued)

OTHER PUBLICATIONS

U.S. Appl. No. 14/072,650, filed Nov. 5, 2013, for an Extendable Sleeve for a Poured Concrete Deck. First named inventor Timothy M. McConnell, Assigned to Securus, Inc.

(Continued)

*Primary Examiner* — Brian Glessner
*Assistant Examiner* — Gisele Ford
(74) *Attorney, Agent, or Firm* — Stetina Brunda Garred & Brucker; Lowell Anderson

(57) ABSTRACT

A tubular passage for poured concrete decks has an intumescent tube held in a two-part, clamshell base by a bottom clip. A first tube engages the base's top to clamp a funnel shaped, diaphragm seal to the base. The first tube has spaced, radially extending, parallel ridges at predetermined distances from the base. Longitudinal channels separate the ridges. An extension tube has inward extending lugs passing along the channels to engage various ridges when rotated to fix the passage length. The extension engages the base bottom for corrugated deck supports. A cap with repositionable, locating filaments closes either tube.

24 Claims, 25 Drawing Sheets

(51) Int. Cl.
*F16L 5/02* (2006.01)
*E04G 15/06* (2006.01)
*H02G 3/22* (2006.01)
*A62C 2/06* (2006.01)
*F16L 5/04* (2006.01)
*H02G 3/04* (2006.01)

(56) References Cited

U.S. PATENT DOCUMENTS

| | | | | |
|---|---|---|---|---|
| 3,173,443 | A * | 3/1965 | Saville | 137/362 |
| 3,731,448 | A | 5/1973 | Leo | |
| 3,834,577 | A * | 9/1974 | Tempero | 312/401 |
| 3,908,323 | A | 9/1975 | Stout | |
| 4,046,279 | A | 9/1977 | Rosler | |
| 4,086,736 | A * | 5/1978 | Landrigan | 52/220.8 |
| 4,313,286 | A * | 2/1982 | Harbeke | 52/220.8 |
| 4,365,784 | A * | 12/1982 | De Stasio | 249/139 |
| 4,587,082 | A * | 5/1986 | Schoening et al. | 376/291 |
| 4,619,471 | A * | 10/1986 | Harbeke | 285/136.1 |
| 4,623,170 | A * | 11/1986 | Cornwall | 285/4 |
| 4,663,204 | A | 5/1987 | Langham | |
| 4,669,244 | A | 6/1987 | Szoke | |
| 4,669,759 | A * | 6/1987 | Harbeke | 285/136.1 |
| 4,748,787 | A * | 6/1988 | Harbeke | 52/741.3 |
| 4,788,800 | A * | 12/1988 | Whiteley | 52/1 |
| 4,817,348 | A * | 4/1989 | Wydra | 52/220.8 |
| 4,850,385 | A * | 7/1989 | Harbeke | 137/75 |
| 4,915,055 | A * | 4/1990 | Ptashinski | 116/209 |
| 5,003,735 | A * | 4/1991 | Bates | 52/105 |
| 5,044,303 | A * | 9/1991 | Culver, Jr. | 116/209 |
| 5,103,609 | A | 4/1992 | Thoreson et al. | |
| 5,156,755 | A * | 10/1992 | Cass | 249/177 |
| 5,174,077 | A | 12/1992 | Murota | |
| 5,237,129 | A | 8/1993 | Obara | |
| 5,240,070 | A | 8/1993 | Ryan | |
| 5,309,688 | A | 5/1994 | Robertson | |
| 5,347,786 | A | 9/1994 | Hodges | |
| 5,456,050 | A | 10/1995 | Ward | |
| 5,509,240 | A * | 4/1996 | Barton, Jr. | 52/220.8 |
| 5,560,163 | A * | 10/1996 | Carlton | 52/169.5 |
| 5,594,202 | A * | 1/1997 | Tobias | 174/505 |
| 5,681,640 | A | 10/1997 | Kiser | |
| 5,725,331 | A * | 3/1998 | Martinez | 405/303 |
| 5,834,535 | A | 11/1998 | Abu-Isa et al. | |
| 6,004,651 | A | 12/1999 | von Montgelas et al. | |
| 6,006,399 | A * | 12/1999 | Massaro | 15/315 |
| 6,168,738 | B1 | 1/2001 | Douchet et al. | |
| 6,176,052 | B1 | 1/2001 | Takahashi | |
| 6,226,939 | B1 | 5/2001 | Atkins et al. | |
| 6,305,133 | B1 * | 10/2001 | Cornwall | 52/232 |
| 6,311,734 | B1 | 11/2001 | Petrovic | |
| 6,645,278 | B2 | 11/2003 | Langille et al. | |
| 6,694,684 | B2 | 2/2004 | Radke et al. | |
| 6,790,893 | B2 | 9/2004 | Nguyen et al. | |
| 6,862,852 | B1 | 3/2005 | Beele | |
| 6,969,799 | B2 * | 11/2005 | Snyder | 174/483 |
| 7,063,130 | B2 | 6/2006 | Huang | |
| 7,080,486 | B2 | 7/2006 | Radke et al. | |
| 7,810,847 | B1 * | 10/2010 | Cornwall | 285/230 |
| 7,877,941 | B2 * | 2/2011 | Fischer et al. | 52/220.8 |
| 8,001,737 | B1 * | 8/2011 | Price | 52/220.8 |
| 8,024,900 | B2 * | 9/2011 | Cordts | 52/220.8 |
| 8,029,345 | B2 * | 10/2011 | Messmer et al. | 454/284 |
| 8,122,680 | B2 * | 2/2012 | Baur et al. | 52/745.17 |
| 8,146,305 | B2 | 4/2012 | Cordts | |
| 8,191,330 | B1 * | 6/2012 | Cornwall | 52/741.4 |
| 8,388,026 | B2 * | 3/2013 | Spears | 285/15 |
| 8,534,715 | B2 * | 9/2013 | Abbasi et al. | 285/338 |
| 8,657,344 | B2 * | 2/2014 | Glazik et al. | 285/302 |
| 8,689,503 | B2 * | 4/2014 | Fischer et al. | 52/220.8 |
| 8,689,504 | B2 * | 4/2014 | Monden et al. | 52/220.8 |
| 8,833,478 | B2 * | 9/2014 | Zernach et al. | 169/48 |
| 2003/0009961 | A1 * | 1/2003 | Radke et al. | 52/220.1 |
| 2003/0024185 | A1 * | 2/2003 | Menzies | 52/219 |
| 2003/0105188 | A1 | 6/2003 | Nguyen et al. | |
| 2003/0192269 | A1 * | 10/2003 | Radke et al. | 52/220.8 |
| 2004/0016190 | A1 * | 1/2004 | Radke et al. | 52/232 |
| 2004/0104498 | A1 * | 6/2004 | Schneider | 264/31 |
| 2005/0022868 | A1 | 2/2005 | Truss | |
| 2006/0160927 | A1 | 7/2006 | Surplice et al. | |
| 2006/0265980 | A1 * | 11/2006 | Vaughan | 52/220.8 |
| 2008/0014398 | A1 | 1/2008 | Tueshaus et al. | |
| 2008/0034687 | A1 * | 2/2008 | Fischer et al. | 52/288.1 |
| 2008/0190505 | A1 | 8/2008 | Condon et al. | |
| 2008/0191102 | A1 | 8/2008 | Condon et al. | |
| 2011/0036038 | A1 * | 2/2011 | von Rummelhoff | 52/577 |
| 2011/0088342 | A1 * | 4/2011 | Stahl et al. | 52/220.8 |
| 2012/0022201 | A1 | 1/2012 | Zhvanetskiy et al. | |
| 2012/0216791 | A1 | 8/2012 | Munzenberger | |
| 2012/0304979 | A1 | 12/2012 | Munzenberger et al. | |
| 2013/0068487 | A1 | 3/2013 | Klein et al. | |
| 2014/0260015 | A1 | 9/2014 | McConnell et al. | |

FOREIGN PATENT DOCUMENTS

| | | |
|---|---|---|
| CA | 2411274 | 5/2003 |
| CA | 2743852 | 12/2011 |
| DE | 2411521 A1 | 10/1975 |
| EP | 0271487 A4 | 3/1989 |
| EP | 0486299 A1 | 5/1992 |
| EP | 0761755 B1 | 4/1999 |
| EP | 1234012 B1 | 2/2008 |
| EP | 1374953 B1 | 7/2009 |
| WO | 9119540 | 12/1991 |
| WO | 2003000823 A1 | 1/2003 |

OTHER PUBLICATIONS

U.S. Appl. No. 14/177,125, filed Feb. 10, 2014, for an Extendable Sleeve For a Poured Concrete Deck. First named inventor Timothy M. McConnell, Assigned to Securus, Inc.

* cited by examiner

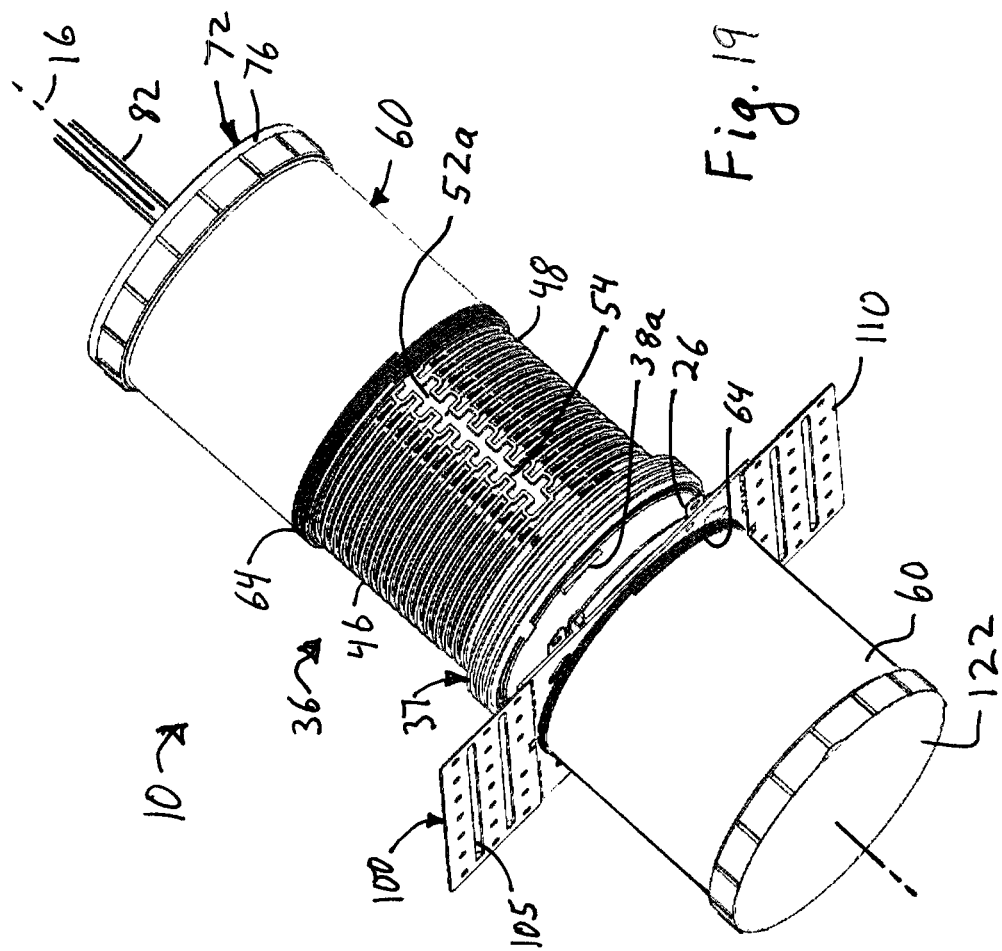

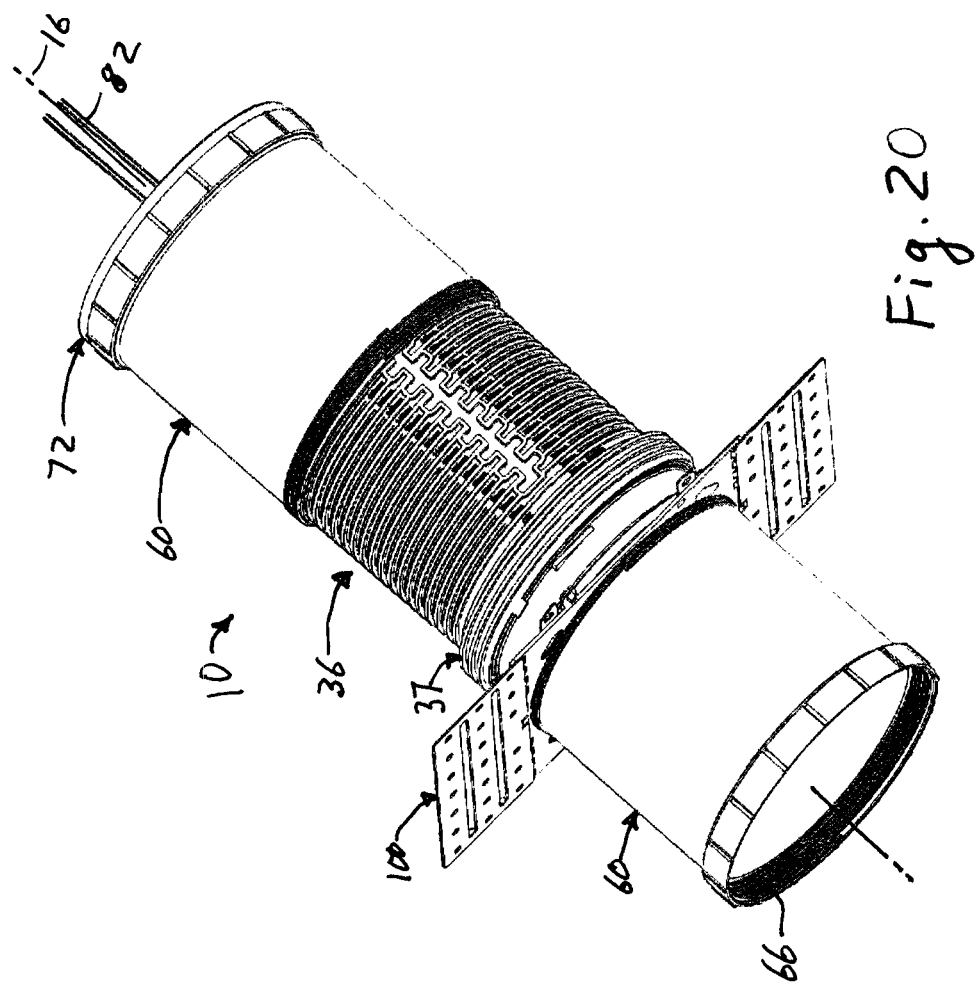

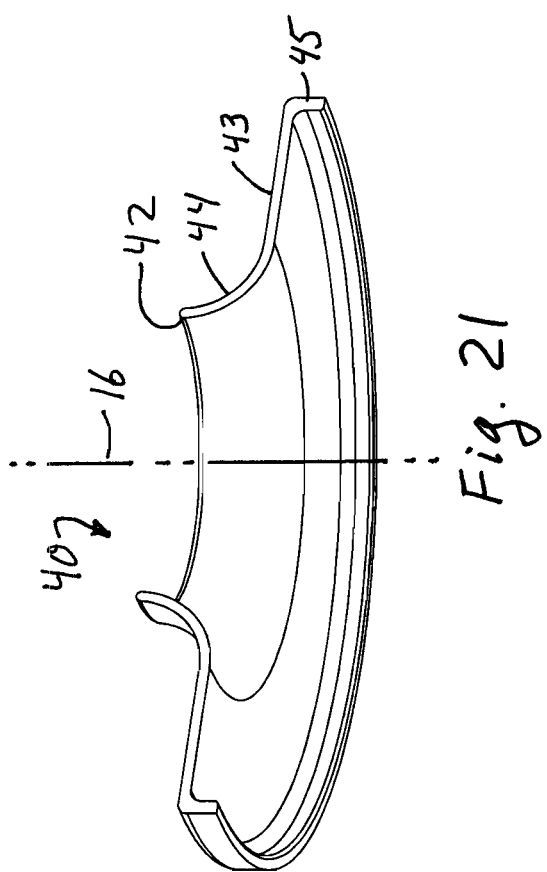

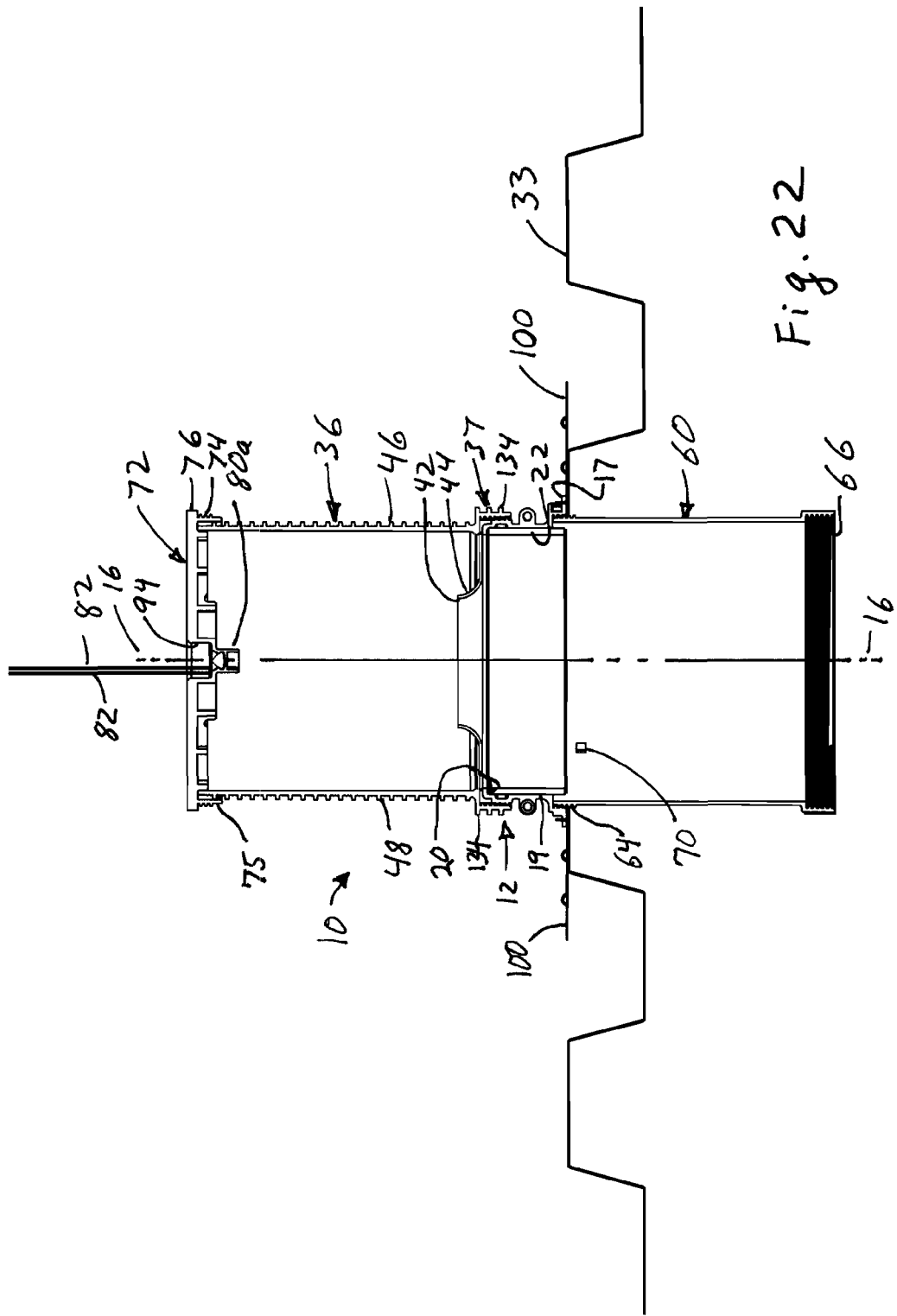

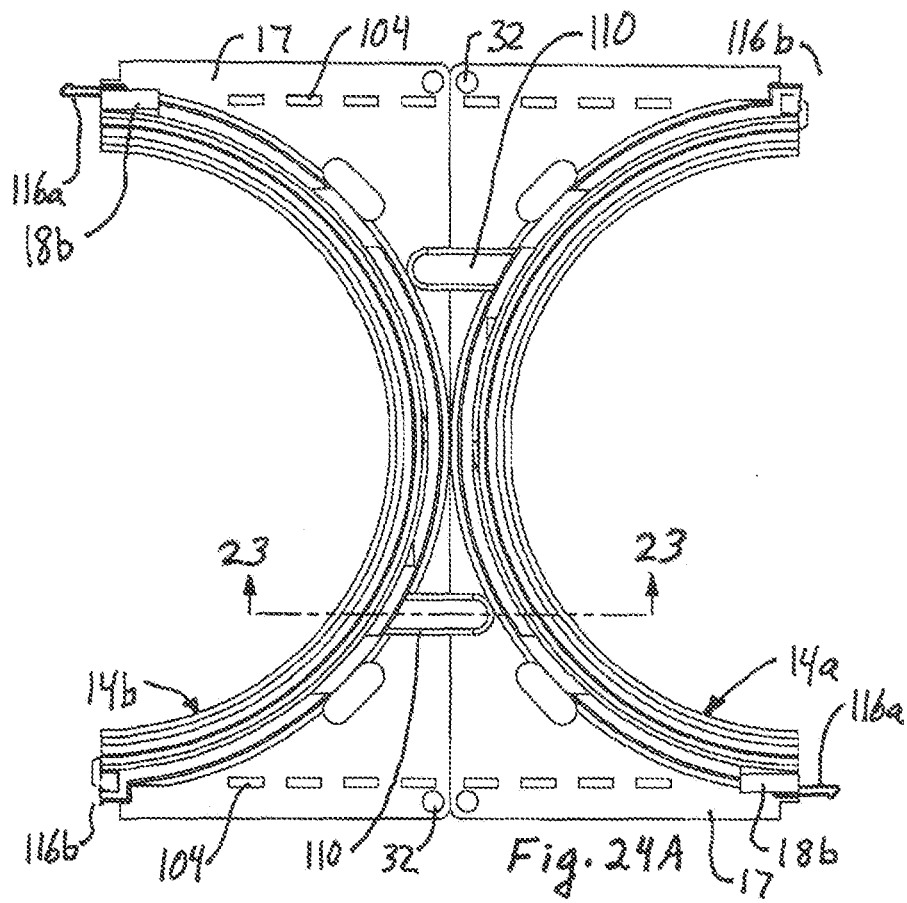
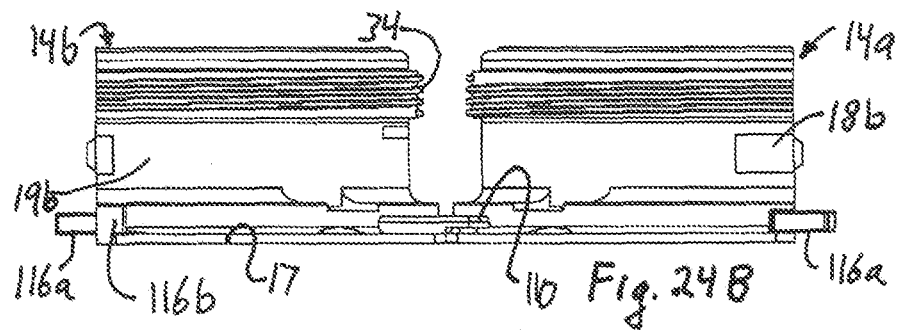
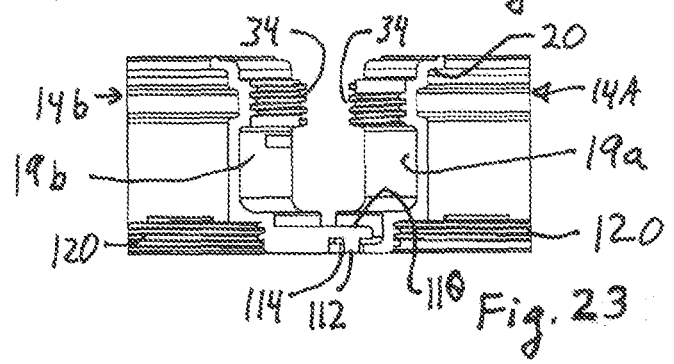

EXTENDABLE SLEEVE FOR POURED CONCRETE DECK

CROSS-REFERENCE TO RELATED APPLICATIONS

This application is a Divisional of application Ser. No. 13/840,003, titled Extendable Sleeve for Poured Concrete Deck, filed Mar. 15, 2013, the complete contents of which are hereby incorporated by reference.

STATEMENT RE: FEDERALLY SPONSORED RESEARCH/DEVELOPMENT

Not Applicable

BACKGROUND

Concrete floors in multistory buildings are poured onto flat plywood decks that are later removed, or poured onto corrugated sheet metal supports that are left in place. In both cases passages through the concrete decks are needed for various plumbing pipes, electrical conduits, ventilation tubes, etc. In the event of fire or flooding, these passages through the concrete must be sealed in order to prevent passage of air, smoke, fire or water. Current fire and smoke seals use an intumescent material that involves taking flat strips of intumescent material and fastening it around a cylindrical container of predetermined diameter using adhesives or other mechanical fasteners. The intumescent material often includes a graphite or fibrous material that can be messy and hazardous to handle and ingest, and often carcinogenic. Fastening the flat strips to the passage tubes is labor intensive, prone to errors and may raise health concerns. Because the intumescent material has a limited expansion, and because many applications require effective internal smoke and water sealing, the containers are generally made to order for specific pipe sizes. Further, because of the variable thickness of concrete slabs specified by builder contractors, manufacturers are forced to either custom build the container hardware or to supply containers in large increments that force customers to buy extra kits or cut the container on-site. In any event, current options do not allow economically effective manufacturing-to-specification solutions. Upon installation, the pipes actually used may differ from those initially planned or may be offset from the center more than the expansion of the intumescent material can accommodate, so the prefabricated, size specific fire seals may not fit, or fit as well as intended or needed, or may not work as well as designed during actual use. There is thus a need for an improved fire seal and container for intumescent material that will accommodate a wider variety of pipe diameters within a single device be more easily assembled and installed, and better suit variations in pipe location and slab thickness than devices currently used.

The passages through the concrete are formed by fastening a passage tube, typically plastic or metal to the support before the concrete is poured. The concrete decks vary greatly in thickness from four to eight inches, but may be as thin as two inches and as thick as 18 inches or more. Current passage tubes are premade to specific diameters and lengths, making it difficult to stock a sufficient supply for use and to accommodate variations in the passage tubes at the job site. There is thus a need for a more flexible length passage tube able to accommodate pipes of varying diameters.

The tubes must be fastened to the plywood support, or have a larger base to span enough corrugations to provide a stable tube support, especially for smaller diameter, longer passage tubes. Providing a large base suitable for corrugated supports is expensive and unnecessary for plywood supports. Moreover, several pipes may sometimes be clustered together when passing through the floor and in such cases the individual passage tubes need to be placed close together at distances driven by CISPI standards. If the passage tube has a large base for use on a corrugated support, it becomes difficult to achieve the desired spacing when the large support is used on either plywood or corrugated supports. There is thus a need for an improved tube support more suitable for the different support applications.

The passage tubes are provided in different lengths to accommodate the variable thickness of the concrete decks. Long passage tubes are sometimes cut shorter, wasting material and often resulting in inaccurate cuts as the worker may measure wrong. Sometimes an extension can be added to a shorter passage tube to increase the overall length, but again workers can measure wrong, resulting in non-compliant passages through the concrete. Also, the extended tubes may be hit, kicked or stood on and in such cases extension tubes may break. There is thus a need for an improved passage tube with a sturdier, easily adjusted length.

In addition to a smoke and fire seal the passages through the concrete must provide a water seal around the pipes or conduits passing through the passage tube. Flat, plastic or rubber sheets are used with holes cut out for the pipe to pass through and these are also installed in the passage tube at the time the passage tubes are made. If the pipes are too large for the holes the sheets tear, if the pipes are too small the seal is poor and if the pipes are offset from the holes in the sheets then inadequate seals may formed. There is thus a need for an improved water seal in passage tubes.

When the concrete deck is poured around the passage tubes the upper end of the tubes are blocked to prevent concrete from filling the passage tube. Mechanical trowels and riding trowels are used to finish the concrete surfaces of the poured decks and the closed ends of the tubes are often covered with a thin layer of concrete in doing so. The concrete covering makes it difficult to locate the passage tubes. Workers sometimes tape nylon strands to items over which concrete is poured so the strands extend out of the concrete surface after finishing and bend for the troweling machines. But taping strands to things is time consuming, may be unintentionally omitted or not planned at all, and the tape may tear lose or otherwise fail to restrain the strands during pouring of the concrete or troweling. There is thus a need for an improved way to locate passage tubes in freshly poured concrete floors.

The passage tubes may need to be configured differently depending on whether they are to contain metal or cast iron pipes or plastic pipes, in part because the water seal with the outside of a cast iron pipe has different requirements than for plastic or copper pipes. For example, exterior pipe diameters differ significantly between pipe types of even the same nominal internal size. Workers can sometimes look inside the passage tube to see the opening size in the water seal but that is time consuming, and invites error from judging opening diameters by visually looking down a dark tube of varying length. There is thus a need for an improved way to allow workers to identify the types of pipes a passage tube is designed to accommodate.

BRIEF SUMMARY

An assembly is provided to form an adjustable length, tubular passage in poured concrete decks. The assembly has a tubular cylinder of intumescent material held in a two-part base by a clip supporting the bottom of the tubular cylinder of intumescent material and fastened to the base. A first, cylindrical tube engages the base's top to clamp a diaphragm seal against the base. The seal has a pipe opening and a funnel shape to accommodate pipe offsets and to better seal against the pipe. The first tube has spaced, radially extending, parallel ridges at predetermined distances from the base. Cutting between the ridges adjusts the length of the tubular passage to known lengths. Longitudinal channels separate the ridges into first and second sets of ridges. Printed indicia in the channels or in the grooves between adjacent ridges can state the lengths. The two sets of ridges can be at different distances from the base for greater variability of length adjustment. A cylindrical extension tube fits over the first tube and has inwardly extending lugs on opposing sides of a first end of the extension tube. The lugs pass along the longitudinal channels with the extension tube being rotated to engage the lugs with various ridges to adjustably fix the passage length to the end of the extension tube. A second end of the extension tube optionally engages the base bottom for use with corrugated supports. A cap with repositionable locating filaments optionally closes the either the first extension tube or the first tube, depending on need. The locating filaments are attached to the underside of the cap and extend inside nested first tube and extension tube for shipment, with the filaments being repositioned to connect to the outside of the cap and extend along the longitudinal axis during use. The locating filaments connect to the cap below the outer surface so the filaments bend during troweling of the concrete and extend above the finished concrete surface to allow users to locate the tubular passage after concrete finishing.

In more detail, there is advantageously provided a tubular passage assembly for poured concrete decks formed on a support surface. The assembly includes a base having a cylindrical sidewall with an upper end and an opposing bottom end and extending along a longitudinal axis. The upper end of the sidewall has an inward extending upper flange defining a circular opening encircling the longitudinal axis. The lower end of the base has an outward extending base flange to support the base on the support surface during use. A cylindrical tube of intumescent material encircles the longitudinal axis and fits inside and adjacent to the sidewall and is restrained from movement in a first direction along the longitudinal axis by the upper flange. A retaining clip has an annular portion abutting the bottom of the tubular cylinder of intumescent material to restrain the tubular cylinder of intumescent material from movement in a second direction along the longitudinal axis. The retaining clip has a plurality of tabs extending through the base sidewall to restrain movement of the retaining clip along the longitudinal axis during use.

In addition to the base assembly, the tubular passage assembly may include a flexible diaphragm seal having an outer periphery engaging an upper end of the base and having an inner periphery defining an opening encircling the longitudinal axis during use. A portion of the diaphragm adjacent the inner periphery has a funnel shape extending out of a plane orthogonal to the longitudinal axis through the outer periphery.

In further variations, the first tube has opposing upper and lower ends with the lower end configured to engage the base. The first tube also may have an inward extending flange adjacent the lower end configured to engage the periphery of the diaphragm and press it against the base to form a fluid tight seal when the first tube is engaged with the base. The first tube may further includes a first set of parallel ridges extending outward from the first tube with each of the first ridges in a plane orthogonal to the longitudinal axis and the first set of ridges each extending less than halfway around the first tube.

The first tube may also include a second set of parallel ridges extending outward from the first tube with each of the ridges in a plane orthogonal to the longitudinal axis. The second set of ridges each extends less than halfway around the first tube and located on an opposing side of the first tube than the first set of ridges. The first and second ridges each have ends spaced apart to define first and second longitudinal channels on opposing sides of the first tube. The first tube may further include a first set of visible indicia adjacent a plurality of the first set of ridges where the indicia defines a distance from the bottom of the base to the visible indicia associated with each of the plurality of the first set of ridges. The first tube may also have a second set of visible indicial adjacent a plurality of the second set of ridges defining a distance from the bottom of the base to the visible indicia associated with each of the plurality of the second set of ridges, with at least one of the first and second set of indicia indicating a distance specified in metric or English distance units.

In further variations, a plurality of the ends of two adjacent ridges in the first set of ridges are joined by first axially extending end segments with the first axially extending end segments joining only two adjacent ridges. A plurality of second axially extending end segments may join adjacent ridges which ridges are each joined to a different one of the first axially extending end segments. The first axially extending end segments are located a first circumferential distance from a center of the first channel and the second axially extending end segments located a second circumferential distance from the center of the first channel with the second circumferential distance being greater than the first circumferential distance to form a first circumferential recess at each second axially extending end segment. Further, a plurality of the ends of two adjacent ridges in the second of ridges may be joined by third axially extending end segments with the third axially extending end segments joining only two adjacent ridges. A plurality of fourth axially extending end segments may join adjacent ridges which are each joined to a different one of the third axially extending end segments. The third axially extending end segments are located a third circumferential distance from the center of the first channel and the fourth axially extending end segments located a fourth circumferential distance from the center of the first channel, with the fourth circumferential distance being greater than the third circumferential distance to form a second circumferential recess at each fourth axially extending end segment.

In still further variations, the base may have an outwardly extending limit stop and the first tube has a tab located to hit the limit stop as the first tube engages the base so as to position the first tube a known distance from a bottom of the base and ensure proper compression of the diaphragm seal. Further, the base may have external screw threads threadingly engaging internal screw threads on the lower end of the first tube to engage the first tube to the base, with the base and first tube each having a motion limit stop located to engage when the first tube is at a predetermined distance from the bottom of the base. Further, the base may be formed of two segments separated along a plane through the longitudinal axis but fastened together to form the base after the tubular cylinder of intumescent material is inserted into at least one segment of the base.

In still further variations, the tubular passage assembly may include a first extension tube having opposing top and bottom ends with the top end threaded internally and the bottom end threaded externally with the same threads as the top end. The bottom end of the first extension tube has first and second locking lugs each extending inward from a different opposing side of the first extension tube with the first and second locking lugs being sized and located to slide along the first and second channels, respectively. Rotation of the first extension tube places each locking lug between two adjacent ridges of one of the first or second sets of ridges. Further, the upper end of the first extension tube may have internal threads sized to threadingly engage external threads on the cap with the first extension tube being large enough to fit over the first tube. This first extension tube may also act as a lower extension in cooperation with threads formed in the base located to threadingly engage threads on one end of the extension tube. Still further, additional extension tubes may be threaded into the first extension tube if needed, to further lengthen the tube.

In further variations, the flexible diaphragm is made of silicone and has sidewalls curving upward away from the base and toward the longitudinal axis, with the curved sidewalls located intermediate the inner and outer periphery. The base flange may extend along at least two opposing sides of the base and further includes at least a first stabilizing plate configured to releasably fasten to one of the at least two opposing sides of the base flange and restrain rotation of the upper end of the base toward the juncture of the base flange with the stabilizing plate.

An improved cap is also provided for use with the tubular passage assembly. The cap has a circular top having an upper and lower side with an annular skirt depending therefrom. First and second latches each extend inward from an opposing side of the skirt. The latches are configured to releasably engage one of the ridges on the outside of the first tube in order to fasten the cap to the first tube. Also, the cap may have external threads for attaching to the first extension tube. The cap has a connector on at least the upper side of the top with the connector located in a recess. A filament base has at least one filament extending therefrom and is configured to releasably engage the connector to hold the at least one filament generally parallel to the longitudinal axis. The juncture of the filament to the filament base being located below the upper side of the top and sufficiently far from the recess edge so that the at least one filament can be troweled against the upper side of the top and not break, the filament having a length sufficient to be visible after the cap is covered with a thin layer of troweled concrete during use.

There is also provided a kit for forming a tubular passage along a longitudinal axis for passage of a pipe through a poured concrete deck. The kit includes a base assembly having a base formed of two opposing housing portions fastened together to form a cylindrical sidewall portion containing a tubular cylinder of intumescent material adjacent the cylindrical sidewall portion. The tubular cylinder of intumescent material encircles the longitudinal axis and has its motion limited in a first direction along the axis by the housing and has movement in the opposing direction along the axis limited by a clip engaging the housing. The kit may include a flexible diaphragm seal having a central opening selected to seal against a range of pipe diameters during use. The seal has a funnel portion between an outer periphery and the central opening. The kit may also include a first cylindrical tube configured to fasten to a top of the base assembly during use and encircle the longitudinal axis during use. The first tube and base are configured to clamp a periphery of the flexible diaphragm between them sufficiently to form a fluid tight seal.

In further variations, the first tube of the kit has a plurality of outwardly extending, equally spaced ridges on an exterior surface thereof and extending along a majority of a length of the first tube. The kit also may include a first cylindrical extension tube having a first end configured to fit over the first tube and having at least one lug configured to engage a selected one of the plurality of outwardly extending ridges to releasably fasten the first extension tube to the first tube. The kit may further include a first tube that fastens to the top of the base by a double lead threaded connection. The base may have internal, double lead threads on a bottom thereof which threads encircle a lower portion of the tubular cylinder of intumescent material and are configured to threadingly engage mating threads on the first cylindrical extension tube.

The first tube may also form a separate improvement. The first tube may form a tubular passage along a longitudinal axis for passage of a pipe through a poured concrete deck. The first tube may include a tubular cylinder having an opposing upper and lower ends extending along the longitudinal axis during use. The cylinder has a first diameter along a majority of its length with a larger diameter lower end and internal threads around the inside of the larger diameter lower end. The cylinder may have a first plurality of parallel ridges extending radially outward along a majority of a length of the cylinder and a second plurality of parallel ridges extending radially outward along a majority of a length of the cylinder and axially offset from the first set of ridges. The first and second sets of ridges are preferably separated by first and second channels extending parallel to the longitudinal axis. In further variations, a plurality of the ridges in the first set has distal ends joined by vertical segments at the distal ends of said plurality of ridges.

In the above tubular passages and kits, for use on corrugated supports, a hole is cut through the corrugation and the base positioned over the hole. An extension tube the same as the first extension tube is passed upward through the hole in the corrugation and fastened to the bottom of the base. Preferably the base has mating screw threads encircling the tubular cylinder of intumescent material and thus outward of that cylinder and accessible from the lower side of the base. To enable the screw threads to extend into the base and encircle the tubular cylinder of intumescent material the retaining clip is offset so that the tabs bend upward to form an offset accommodating the bottom screw threads with the tabs then extending outward through openings in the cylindrical sidewalls of the base that encircle the tubular cylinder of intumescent material. As needed, a removable adhesive cover or cap is placed over the bottom of the base to keep debris from entering the base during shipment, during installation, during pouring of the concrete and during application of fire retardant spray. The removable adhesive cover or cap may be removed and placed on the open end of an extension tube that is screwed into the bottom of the base if desired.

The base flanges may have two removable tabs formed in the base. One tab may indicate metal and the other plastic. If the shaped diaphragm and base assembly are selected for use with metal pipes passing therethrough, then the plastic tab is removed so that a user can see from looking at the tab on the base that the passage tube is intended for use with metal pipes. If the shaped diaphragm is selected for plastic pipes then the metal tab is removed so that a user can see from looking at the tab on the base that the passage tube is intended for use with plastic pipes. The indicia indicating metal or plastic pipe is preferably visible from at least the upper side and preferably visible from both the upper and lower sides of the base. Alternatively, the indicia may consist of color-coded inserts installed in openings in the base flange.

BRIEF DESCRIPTION OF THE DRAWINGS

These and other features and advantages of the invention will become more apparent in light of the following discussion and drawings, in which like numbers refer to like parts throughout, and in which:

FIG. 19 is a bottom perspective view of the assembly of FIG. 17;

FIG. 20 is a bottom perspective view of the assembly of FIG. 17 but with the bottom cover removed;

FIG. 21 is a bottom, perspective section view of the diaphragm seal of FIG. 1;

FIG. 22 is a section view of the extendable sleeve of FIG. 17 on a corrugated support;

FIG. 23 is a sectional view taken along 23-23 of FIG. 24a;

FIG. 24a is a top view of two halves of the base housing, each of a different base, joined together;

FIG. 24b is a side view of the joined half-housings of FIG. 24a;

DETAILED DESCRIPTION

Figure 1:
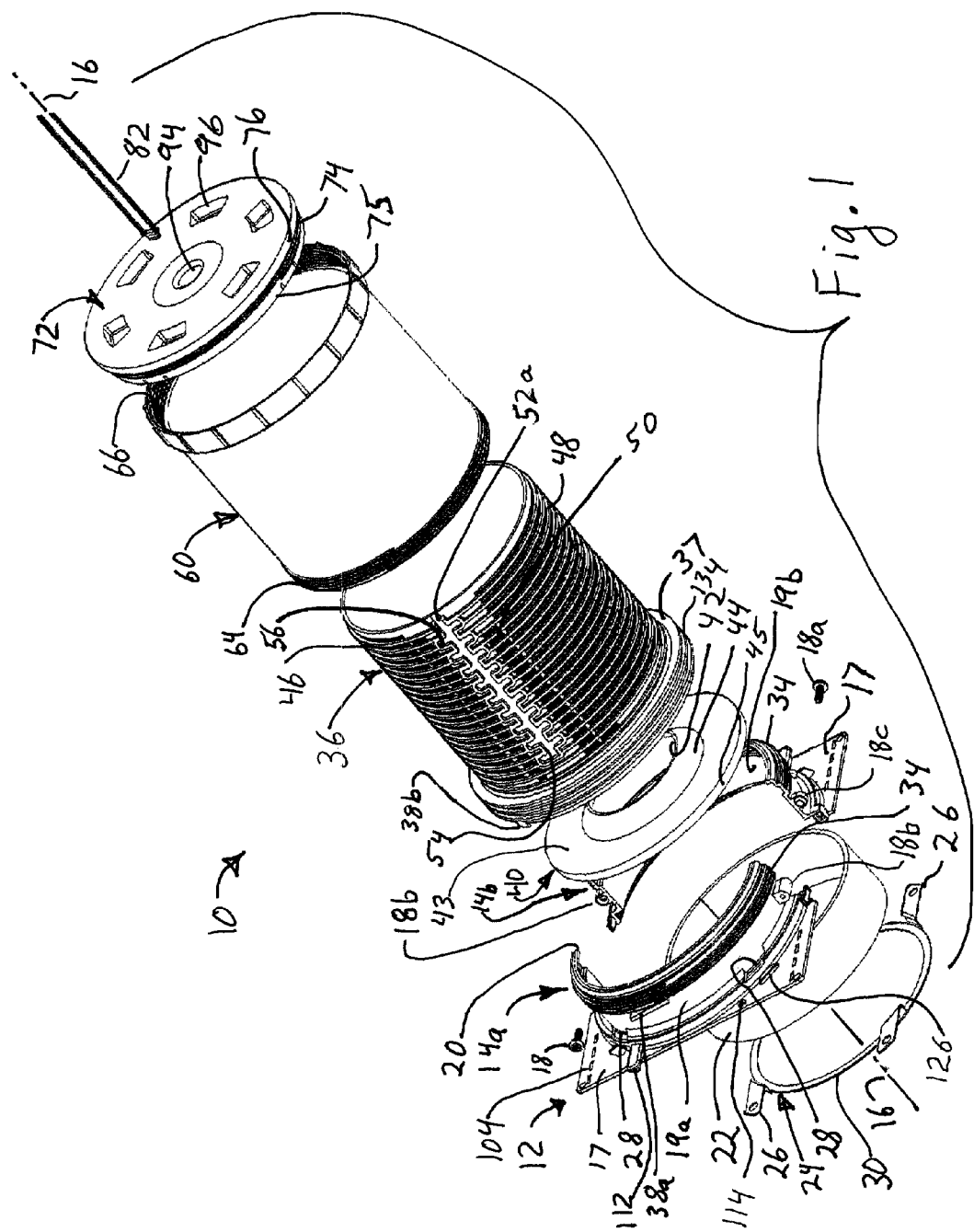
FIG. 1 is an exploded perspective view of an extendable sleeve for forming a tubular passage in a poured concrete floor.

Referring to FIGS. 1-20 a passage tube assembly is provided having a base 12 formed of a housing 14 having two-parts 14a and 14b which clamp radially about a longitudinal axis 16 of the passage tube assembly 10 and base 12, with fasteners 18a clamping mating bosses 18b, 18c on opposing housing parts together in order to secure the housing parts 14a, 14b together. The base preferably has a flange 17 extending outward from the lower end of the base 12. As used herein, the relative terms inner and outer, inward and outward, are with respect to longitudinal axis 16. The relative terms above and below, upper or lower, upwards and downwards are also relative to the position along longitudinal axis 16 with respect to flange 17 on base 12 in the orientation of FIGS. 1 and 4-6, so that housing 14 and passage tube assembly are above base flange 17.

Referring especially to FIGS. 1-3 and 6, the housing parts 14a, 14b each have a curved sidewall extending along the longitudinal axis 16 and an inwardly extending lip 20 on an upper end to restrain upward axial movement of an tubular cylinder 22 of intumescent material placed inside the housing 14. The housing parts 14a, 14b may each have a lower lip (not shown) at a lower end to restrain downward axial movement of the tubular cylinder 22 of intumescent material, in which case the tubular cylinder 22 of intumescent material is placed in one part of the base 12 or housing parts 14a, 14b before the two parts are joined and fastened together to form the base 12. But using two, (one upper and one lower lip) may complicate molding so preferably only one lip is used, upper lip 20, with the tubular cylinder 22 of intumescent material held at the bottom of the base 12 by a retaining clip 24 having tabs 26 that pass through mating openings 28 in each of the two-part housing 14 as the two parts of the housing are assembled.

The retaining clip 24 has an annular bottom portion 30 to hold the bottom of the tubular cylinder 22 of intumescent material, with the annular bottom portion being offset axially from four extending tabs 26 for reasons discussed later. After assembly, the tabs 26 extend from the inside to the outside of housing 14 and the tabs are then bent to lock the retaining clip 24 in place so the tubular cylinder 22 of intumescent material is constrained on three sides by the annular bottom portion 30 of the clip 24 and the base's sidewall 19 and upper lip 20, so that thermal expansion of the tubular cylinder 22 of intumescent material is directed generally inward toward longitudinal axis 16.

The two parts of housing 14a, 14b are fastened together by snaps locks, threaded fasteners, other mechanical locks, or adhesives, with screws 18 being illustrated in the Figures. The lower end of the base 12 has flange 17 extending outward from the base's sidewall 19 with holes 32 in the flange to allow the flange to be nailed, screwed or otherwise fastened to a support 33. That provides an easily molded housing 14 that may be quickly assembled to form base 12, with retaining clip 24 holding the tubular cylinder 22 of intumescent material in place within the base 12.

The tubular cylinder 22 of intumescent material may be a continuous annular ring or a split ring with two adjacent ends separated by a slot. However, the cylinder 22 may also be formed by methods obtained from prior art, including rolled shapes of intumescent materials. The tubular cylinder 22 of intumescent material is preferably preformed for easy of assembly. The tubular cylinder 22 of intumescent material may be formed in a corrugated shape to expand faster and to expand to a greater distance than previously achieved.

Referring to FIGS. 1-3 and 11-12, the upper end of the base 12 may have external threads 34 so that a lower end of a first sleeve or tube 36, preferably a graduated tube 36, can threadingly engage the base 12 via mating internal threads 35 (FIG. 12) on the inner surface of the first tube 36 adjacent the lower end of the first tube 36. By graduated, it is meant the outer surface of the tube 36 has physically protruding length indicators, described later. Advantageously, the cylindrical wall forming first tube 36 is generally concentric with the lip 20 on the base 12, requiring a lateral, outward offset, stepped or enlarged portion 37 so that the bottom end of first tube is larger in diameter than the remaining upper portion of tube 36, with the internal threads 35 formed on that enlarged stepped portion.

The threads 34 are preferably double lead threads, with one lead on each half 14*a*, 14*b* of the housing. Thus, the mating threads 35 on first tube 36 are also preferably double lead threads. A rotation stop 38*a* on sidewall 19, just below the threads 34 abuts a mating stop 38*b* on the bottom end of first tube 36 in order to limit the engagement of mating threads on the base 12 and first tube 36 and also accurately positions the first tube 36 relative to the base 12 and particularly positions the tube 36 relative to base flange 17.

As best seen in FIGS. 1, 6, 12, 16 and 21, the first tube 36 clamps an outer periphery of a shaped seal diaphragm 40 against the cylindrical wall forming base 12, preferably against the inwardly extending upper lip 20 of the base 12. The first tube 36 may have an inwardly extending flange 39 (FIG. 12, 16) located concentric with the location of upper lip 20 or another portion of base 12 to squeeze and seal against the seal 40. The inward flange 39 is preferably at the juncture of the enlarged or stepped portion 37 with the remainder of the first sleeve or tube 60 so as to provide a larger radially extending surface to abut the periphery of diaphragm seal 40. The depending skirt 45 of the diaphragm seal 40 is advantageously located between an inner surface of the stepped portion 37 and an outer surface of the base 12 adjacent lip 20. Thus, the lip or skirt 45 on the diaphragm seal 40 resists radially inward motion when it is clamped between the base 12 and the first tube 36. That provides a strong, fluid seal for the outer periphery of diaphragm seal 40 with the mating base 12 and first tube 36. The periphery seal is believed capable of meeting and preferably exceeding regulatory fluid retention requirements.

The diaphragm 40 has a central opening 42 that is preferably surrounded by an inclined or curved, funnel shaped wall 44 that encircles and defines opening 42. As used herein, the term "funnel shaped" includes walls that are straight and inclined (e.g., like a cone) and also includes curved walls. The funnel shaped wall 44 in turn preferably joins a generally planar annular portion 43 having a depending skirt 45 at an outer periphery thereof. The opposing surfaces of the base 12 and the first tube 36 advantageously, but optionally have sealing surfaces, such as opposing tongue-and-groove configurations, in order to further ensure the parts sealingly engage opposing surfaces of the diaphragm seal 40. The opposing surfaces of the base 12 and first tube 36 clamp the outer periphery of the diaphragm seal 40 adjacent the depending flange 45 and in the flat annular portion 43 near the juncture with the flange 45.

In use, a pipe extends along longitudinal axis 20 and through the opening 42 which seals against the outer surface of the pipe. The opening 42 is selected to be sufficiently smaller in diameter than the outer diameter of the pipe that a fluid tight seal is established meeting and preferably exceeding regulatory requirements. The pipe basically stretches the elastic opening 42 and funnel shaped portion 44 to form a friction seal with the pipe. Further, the base 12 and pipe are fit relative to each other so the pipe passes through the diaphragm seal 40 in the axial direction along which the funnel shaped portion 44 is directed, the upward direction. That allows fluid collected between the inside of the first tube 36 and the outside of the pipe to press the funnel shaped portion 44 against the pipe further increasing the sealing force. As desired, the funnel shaped portion 44 may have concentric ridges encircling the opening 42 in order to increase the grip between the funnel shaped portion 44 and the pipe during use, and to further increase the water seal between the parts.

The funnel shape wall 44 also allows lateral movement of the opening 42 in order to accommodate pipe locations that are offset from the desired center position along axis 16. The curved, funnel walls 44 also allow more flexibility in the opening 42 before tearing and may lie against the pipe to provide a better seal. An elastomeric or rubber diaphragm 40 is believed suitable, preferably silicon or neoprene. The seal 40 is preferably made of a thin, flexible material. As used herein for the seal 40, thin means a thickness between opposing surfaces that is less than about 10% the diameter of the seal at the outer periphery and preferably less than 5% of the diameter of the seal at the outer periphery. The opening 42 is smaller than the diameter D of the smallest pipe that is intended to be passed through the tubular passage assembly 10 and seal 40 so the pipe stretches the opening 42 and creates a frictional grip to help form a water seal. Pipe diameters D from 0.5 inches to 4 inches are common, with larger diameters D up to 8 inches being less common.

Referring to FIGS. 1 and 4-12, the first tube 36 has a first and second set of outwardly extending ridges 46, 48, respectively forming intervening slots between the respective ridges of each set. The first ridges 46 and intervening first slots each extend about half way around a first side or first partial circumference of the first tube 36. The second set of ridges 48 and second slots between those second ridges extend about half way around the opposing, second side or second partial circumference of the first tube 36. The ridges 46, 48 on the first and second sides of the first tube 16 are equally spaced apart about the distance of a saw blade used by construction workers. The first set of ridges are offset from the second set of ridges, with the first set of ridges being spaced in fractions of an inch and the second set of ridges being spaced metrically, preferably in millimeters. Visible indicia 50 (FIGS. 1 & 7) on the first tube 36 discloses a distance from the bottom of the base to each slot, or to the bottom of each ridge (46, 48) forming the slot, so that a worker can cut the first tube 36 to desired, known length by cutting at a slot, with the saw blade guided by the opposing ridges 46 or 48 on each side of the slot. The ridges may be viewed as graduations on the outside of the first tube 36, which is why the first tube 36 may also be referred to as a graduated tube. Regardless of terminology, the graduated ridges 46, 48 and printed indicia 50 identify a plurality of graduated distances from the bottom of the flange 17 of base 12.

The first and second sets of ridges 46, 48 and their intervening slots are in radially aligned planes extending orthogonal to axis 16. These sets of ridges 46, 48 are separated by first and second longitudinal channels 52*a*, 52*b* located on opposing sides of the first tube 36. As desired, the printed indicia 50 may be located in one or both longitudinal channels 52*a*, 52*b*, or on the outer sides of cylinder 36 in the spaces between adjacent ridges 46 or 48. The ends of two adjacent ridges 46 or two adjacent ridges 48 within each set of ridges may be joined by axially extending end segments 54 (FIG. 7), with alternating pairs of ridges joined by offset end segments 56 (FIG. 7) that are offset circumferentially a short distance from end segments 54 each other to form staggered axial end connections. A latching protrusion 58 (FIG. 7) may extend axially from or near the axially extending end segments 54 to form a snap lock connection described later.

A first extension tube 60 is provided with threads 64, 66 on opposing lower and upper ends of the tube, respectively, preferably with external threads on one end and internal threads on the other end. The threads 64, 66 are preferably double lead threads with one lead beginning on an opposing side of the tube 60 as the other lead. The depicted embodiment has external lower threads 64 and internal upper threads 66. Opposite the external threads 64 on the lower end of extension tube 60 are first and second, locking lugs 70 (FIG. 6) extending inward from opposing inner sides of the extension tube 60 at or adjacent to the end of the extension tube 60. Each locking lug 70 is sized in its circumferential direction to fit within one of the first and second channels 52a, 52b so the extension tube 60 can slide along the outside of the first tube 36. The locking lugs 70 are sized fit into the gaps formed by the staggered axial end segments 54, 56 so that rotating the first extension tube 60 places at least one and preferably both of the locking lugs 70 between two adjacent ridges 46 or 48 on the first tube 36. The latching protrusion 58 advantageously engages a mating recess on the upper edge of the adjoining locking lug 70, to snap-lock the extension tube 60 to the first tube 36. The ends of the ridges 46, 48 and the axial end segments 54, 56 restrain rotation of the lugs 70 and also provide an axial strength if a worker strikes or steps on the extension tube 60. Thus, the lugs 70 hit end segments 54, 56 to stop axial movement of the tube 60 until the lugs are rotated into the channels 52a, 52b.

The first extension tube 60 is a known length L and by viewing the distance reflected by the visible indicia 50 marked on the outer sides of the first tube 36 and aligned with the lower edge of the first extension tube 60, the length from the bottom of flange 17 on the base 12 to the upper, distal end of the extension tube 60 is known. For example, if the lower edge of extension tube 60 is aligned with the ridges 46 or 48 corresponding to printed indicia 50 indicating a distance of 3 inches from the bottom of flange 17 on base 12, and if the extension tube 36 is 5.5 inches end to end, then the distal end of the first extension tube 70 is 3+5.5=8.5 inches from the bottom of base 12. That system allows easy adjustment of the height of the passage tube assembly.

Figure 9:
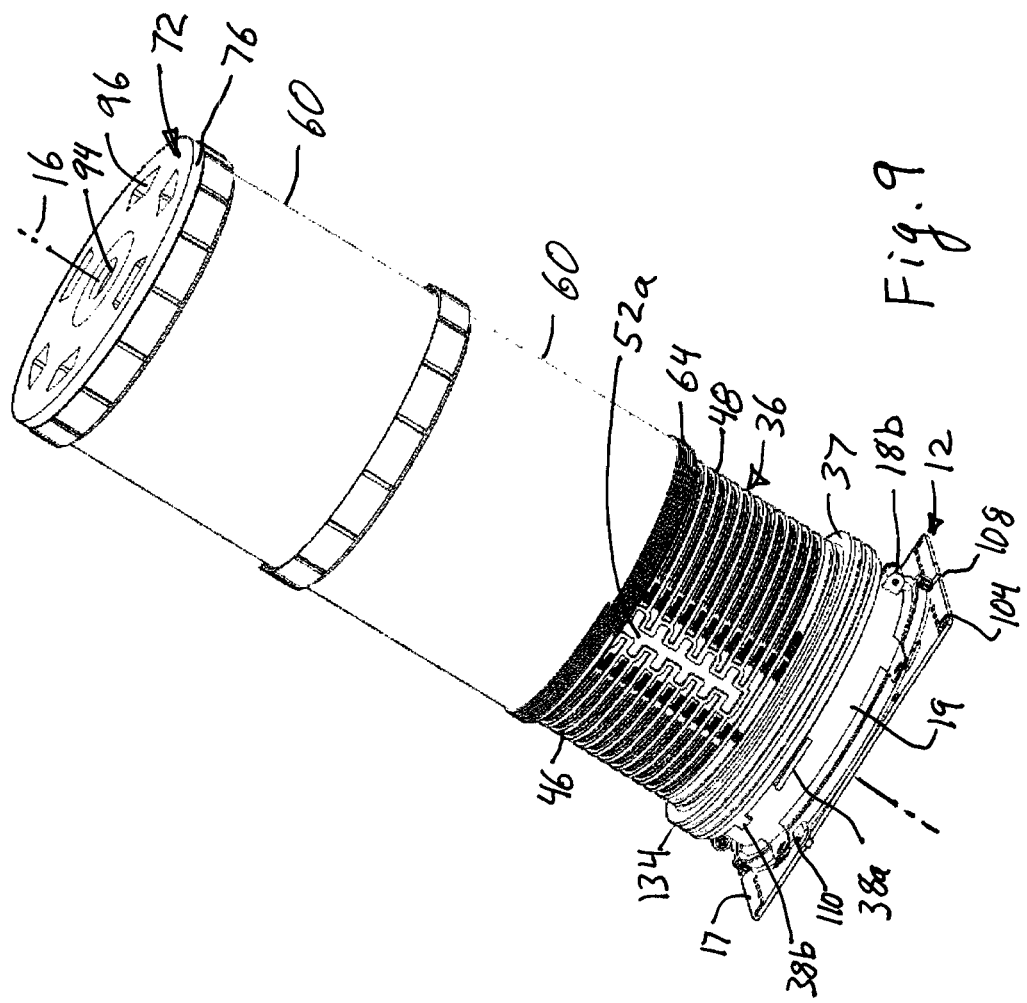
FIG. 9 is a top perspective view of the extendable sleeve of FIG. 1 with a second extension tube thereon.
Figure 10:
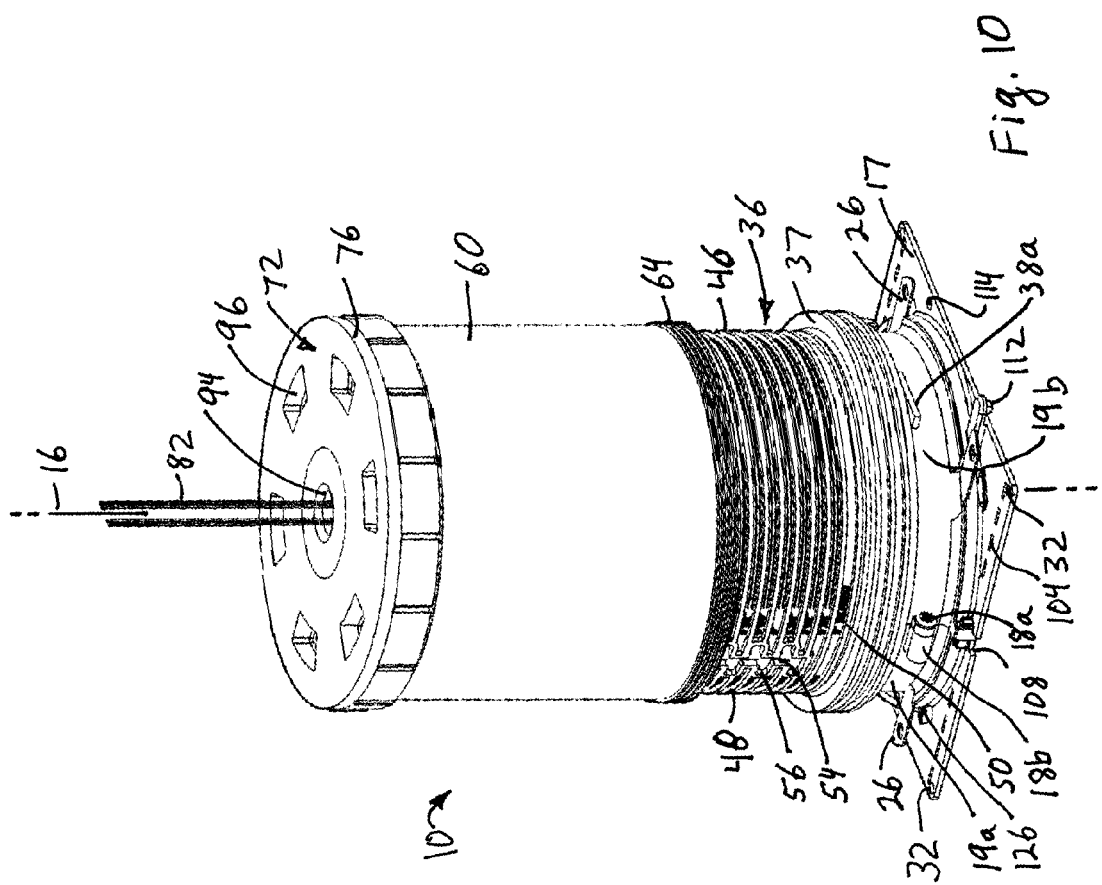
FIG. 10 is a top perspective view of the extendable sleeve of FIG. 1.
Figure 11:
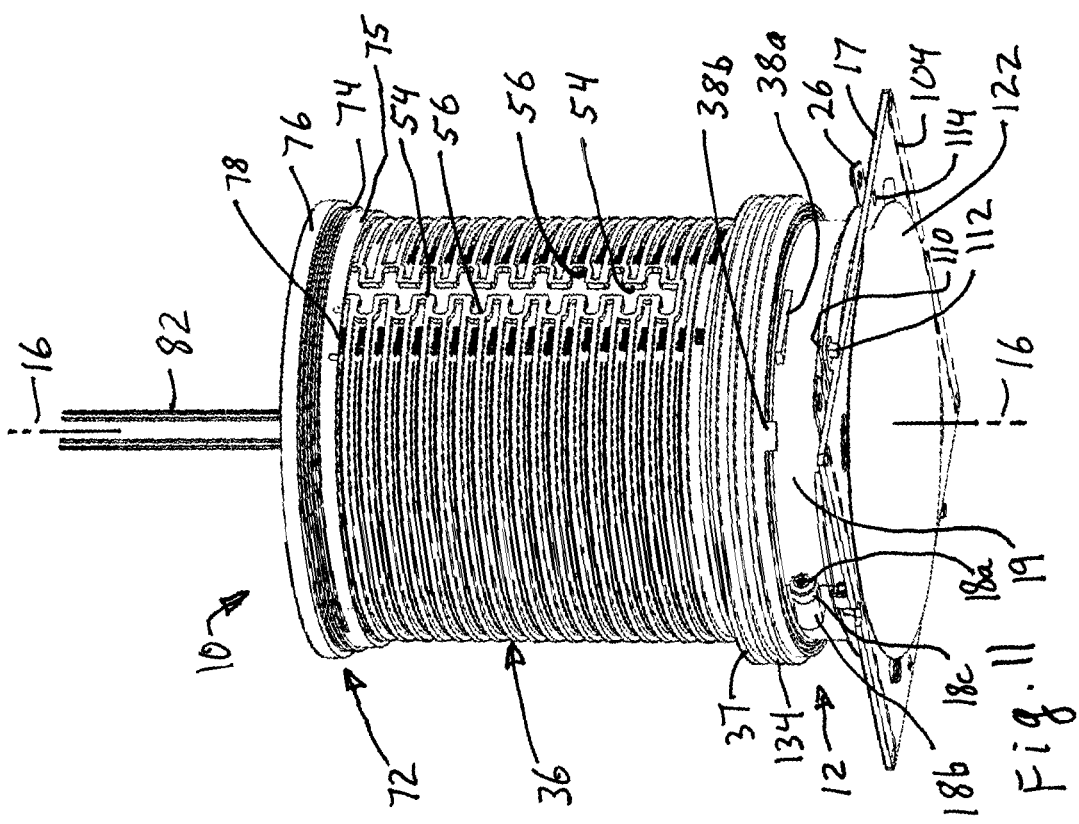
FIG. 11 is a bottom perspective view of the base and first tube and cap of FIG. 1.

When the first extension tube 60 is fastened to the first tube 36 the free or distal end of the extension tube 60 can be closed off or another extension tube 60 can be added. If another extension tube 60 was added to the above example, the distance of passage tube assembly would be 3+5.5+5.5=14 inches from the flange 19 to the end of the second extension tube 60. Additional extension tubes may be added by use of the mating threads 66 on the distal end of the first extension tube 60, as seen in FIG. 9. Again, the extension tubes 60 are each of known length and preferably all the same length so the height to the end of a stack of extension tubes can be readily determined by adding one or more extension tubs 60. Depending on how the end of the distal extension tube 60 is closed, some length accommodation may need to be made to accommodate for the closure.

The end of the last extension tube 60 can be closed by a cap 72 having a skirt that fits inside or outside the distal end of the last extension tube 60, but preferably the cap 72 has threads 74 configured to threadingly engage 66 on the end of extension tube 60. The cap threads 74 are thus preferably also double led threads, with one lead beginning on an opposite side of the cap as the other lead. Since the threads 66 are preferably internal threads the cap threads 74 are preferably external threads, preferably on a depending skirt 75 depending from a slightly larger annular top that results in an annular flange 76 abutting the distal end of the extension 60 to more accurately define the length of the tubular passage assembly 10 when the flange 76 abuts the distal end of extension tube 60, increasing the length of tubular passage assembly 10 by the axial length of the flange 60. The annular flange 76 abutting the distal end of extension tube 60 also provides a stronger assembly to transfer forces along longitudinal axis 16 through the extension tube 60.

Referring to FIGS. 5-8 and 15-16, if the first tube 36 is cut to length between ridges 46, 48 and no extension tube 60 is used, or if the first tube 36 is not cut but no extension tube 60 is used, then the cap 72 is fastened to the ridges 46, 48 on the first tube 36 by one or more latches or lugs or snaps 78 (FIG. 14-16) extending inward from the cylindrical skirt on which the threads 74 are formed. The lugs 78 may optionally, but less preferably correspond to lugs 70 and fit within channels 52a, 52b and engage ridges 46, 48 in the same or similar manner, the description of which is not repeated. Preferably though, the lugs 78 may take the form of snap locks with a surface inclined to resiliently bend and slide over the ridge 46, 48 on the distal end of the first tube 36 and latch into the groove between the adjacent ridges. Opposing ends of lugs 78 may be bounded by slits through the skirt 75 on which the lugs are formed to provide a resilient latch that can bend to slide over the ridges 46, 48. The skirt 75 of the cap 72 thus has a releasable fastening mechanism on both sides of the skirt, with cap threads 74 on the outer surface of the skirt and snap locks or lugs 78 on the inner surface of the skirt.

Figure 12:
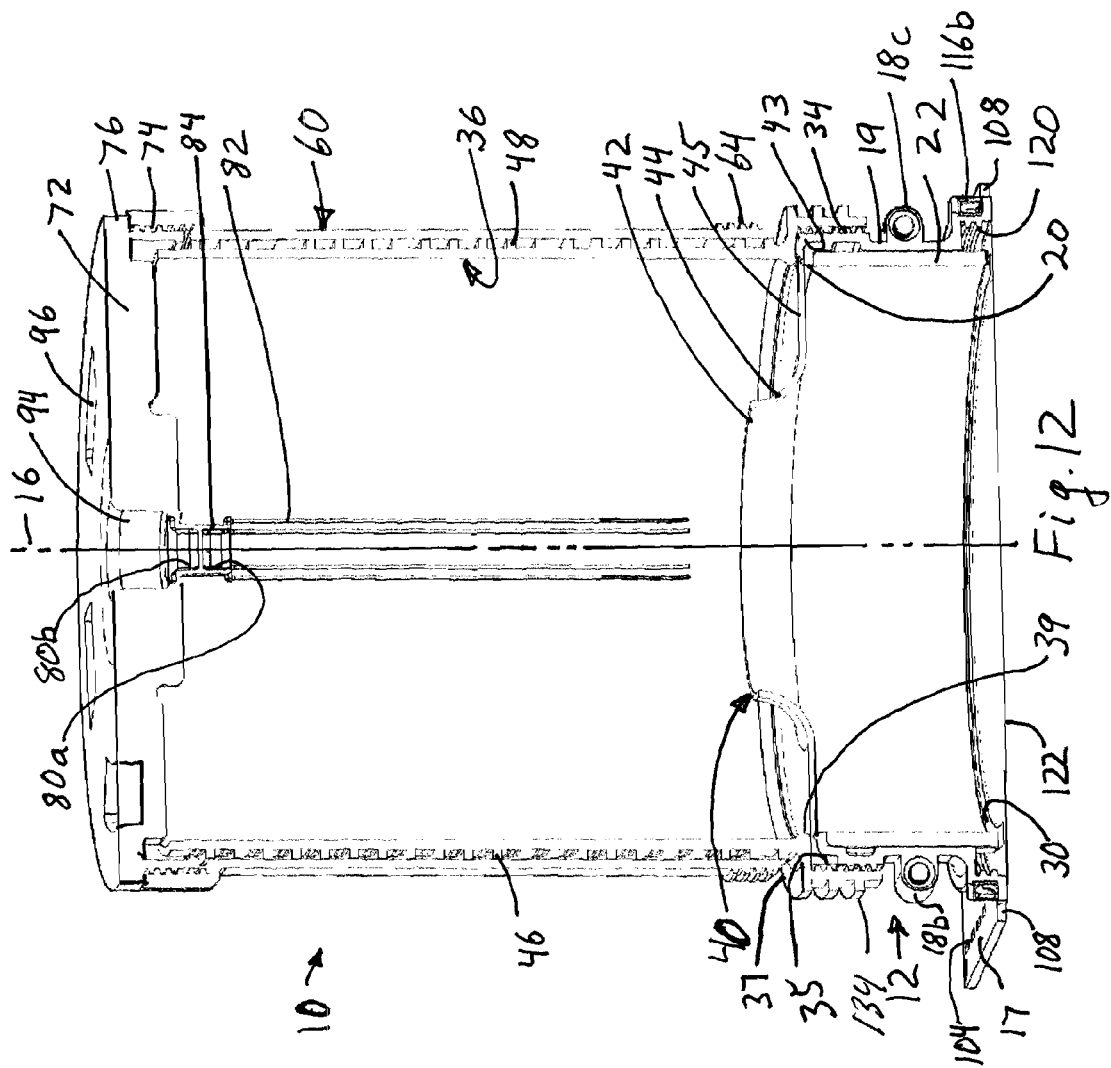
FIG. 12 is a section view of the extendable tube of FIG. 6 with a cap and locating filaments thereon in a position for shipping.
Figure 13:
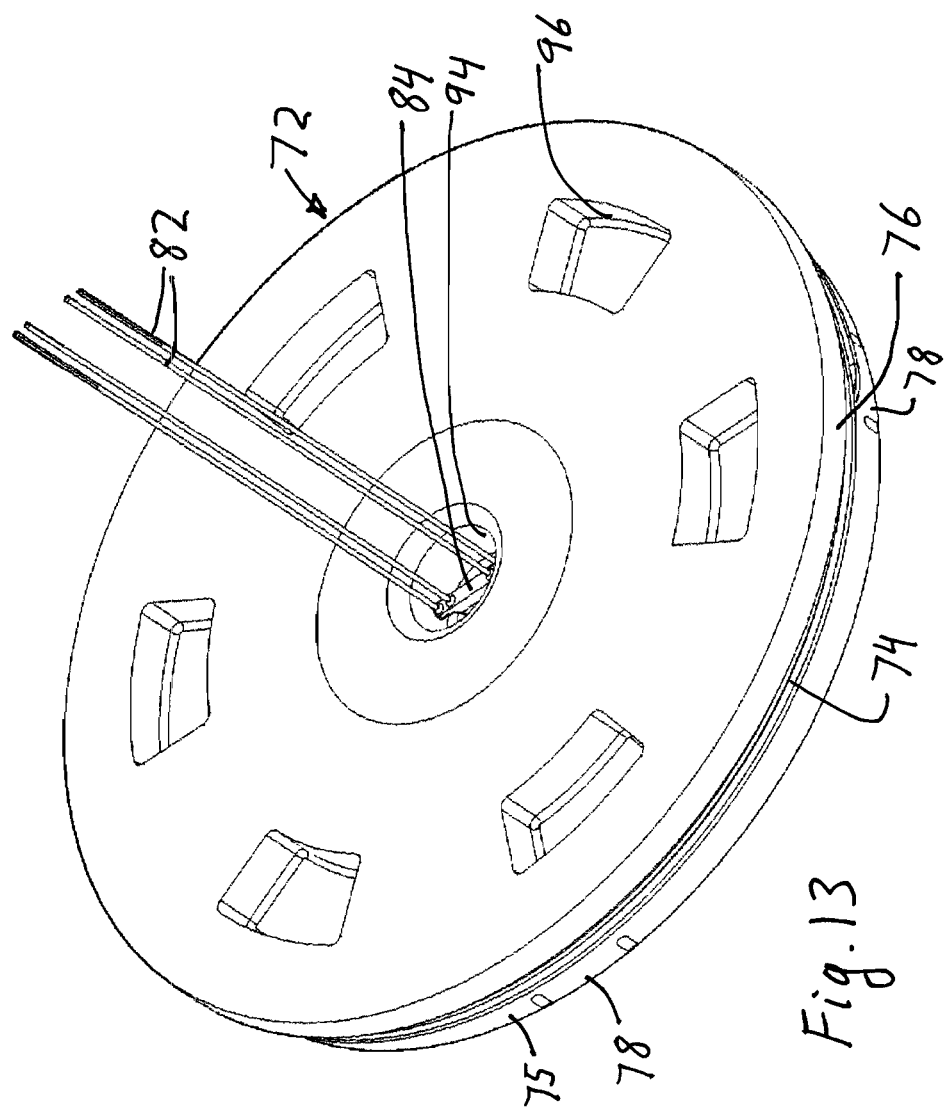
FIG. 13 is a top perspective view of a cap of FIG. 1.

Referring to FIGS. 1 and 12-16, the cap 72 may have an inner and outer mount or connector 80a, 80b respectively each on respective internal and external surfaces of the cap 72. At least one and preferably two pairs of locating filaments 82 extend from a filament base 84 that is configured to mate with each of the connectors 80a, 80b. The connectors 80 may comprise a shaped recess or shaped protrusion, with the mating filament base 84 comprising a protrusion or recess with a mating shape. During shipment, as seen in FIG. 12, the filament base 84 may be releasably connected to the inside connector 80a of the cap 72, preferably at the center of the cap 72 so the locating filaments 82 extend along the longitudinal axis 16 inside the extension tube 60 and/or inside the first tube 36. The filament 82 and its base 84 may be shipped separately, but then they may be more easily separated and lost so it is preferably to ship the parts as a unit. During installation, the cap 72 is removed, the length of tubular passage assembly 10 adjusted by cutting the first tube 36 or positioning one or more extension tubes 60 on the first tube 36.

Referring to FIGS. 1, 10-11 and 13, after the length of the tubular passage assembly 10 is adjusted, the cap 72 is screwed onto the distal extension tube 60 or latched onto the ridges of the first tube 36—but only after the connector and locating filaments are removed from the inside of the cap 72 and fastened to the connector 80b on the outside of the cap 72 so the locating filaments 82 extend upward along the longitudinal axis of the tubes and away from the base 12 of the tubular passage.

When concrete is poured and finished, the locating filaments 82 will stick out of the concrete so the distal end of passage tube assembly covered by cap 72 can be located. The locating filaments 82 are selected to be thin enough to bend and not break during troweling of the concrete, and the connector 80 and filament base 84 are configured and located relative to the cap 72 so the locating filaments bend at the juncture with the connector rather than break during troweling. Nylon monofilaments about 20 to 40 thousandths of an inch in diameter and about 2-6 inches in length are believed suitable. The monofilaments could be color coded to reflect the type of pipe with which the tubular passage assembly 10 is intended for use, such as red for metal and white for plastic. Similarly, tabs could be provided having matching color coding. The removable tabs 124 are visible only from the bottom after the concrete deck is poured so color coded filaments 82 could provide a visible indicator from the top side of the concrete surface. Since the pipes are preferably run from the bottom up, and since the filaments 82 and cap 72 may be lost or attached to the wrong passage assembly 10, the removable tabs 124 are the preferred identification mechanism.

Referring to FIGS. 12-16, the exterior connector 80b is preferably located in a recess 94 preferably a cylindrical recess centered on longitudinal axis 16 during use. The recess 94 preferably has rounded or chamfered edges to reduce cutting, damaging or breaking of abutting locating filaments 82. The connector 80b and filament base 84 are sized so the juncture of the locating filaments 82 with the filament base 84 is located below the exterior surface of the cap 72 so that when a trowel blade or float repeatedly bends a filament 82 flat against the concrete surface the filament does not break off but resiliently resumes its position parallel to the longitudinal axis 16. The exterior, axial facing surface of the cap 72 may have wrenching recesses 96 into which a user can insert wrenching tools, such as the jaws of channel-lock pliers, in order to help rotate the cap and remove it after concrete has hardened.

Referring to FIG. 12, during shipment, the first extension 60 may be placed outside of and concentric with the first tube 36, with the lugs 70 sliding in channels 52 and then rotated to engage the lower ridges 46 or 48 adjacent base 12 to fasten the extension tube 60 to the first tube 36. The cap 72 can be threadingly fastened to the threads 66 on the first extension tube 60, with the locating filaments 82 inside the tubes 36, 60 where they will not be broken easily or lost. The cap 72 prevents debris from entering the tube from the upper end of the assembly and thus provides a safety guard to protect personnel foot traffic on the unfinished building floor.

Referring to FIGS. 1-9 and 11-12, the flange 17 19 extending outward from the base 12 can be fastened to a support 33, with FIG. 22 showing a corrugated support 33. Deck corrugations can vary from two to six inches from top to bottom. The support 33 may be a flat surface such as a plywood support or other flat support during use. If the diameter of the base 12 and first tube are large enough so they always extend across at least two or three adjacent corrugations of a corrugated support 33 then the tubular passage assembly 10 is largely self-supporting and the flange 17 may mount to triangular shaped ears of a square with the circular passage of sidewall 19 having the roughly same diameter as the length of a square shaped flange 17 and centered in that square flange. If the diameter of sidewall 19 and tube 36 are smaller, then the base flange 17 must extend over enough corrugations to provide a stable support for the tubular passage assembly 10 and to allow fastening to the corrugated support 33 (FIG. 22). In short, larger flanges 17 may be needed for tubular passages 10 having smaller diameter passages when the tubular passages are used on corrugated supports 33 rather than flat supports 33.

Referring to FIGS. 1 and 17-20, if a corrugated support 33 is used, then removable stabilizing plates 100 may be attached to a plurality of flanges 17, preferably to opposing flanges 17. One or more, and preferably a plurality of offset fingers 102 on one side of a rectangular stabilizing plate may mate with correspondingly located openings 104 along an edge of one of the base flange 17. Preferably the fingers 17 are generally rectangular strips with rounded distal ends bent to place the rounded distal ends in a plane parallel to but above the plane of the stabilizing plate 100. The openings 104 preferably take the form of slots spaced to correspond with the locations of the fingers 102. Each of the rounded distal ends of the fingers 102 pass from the bottom of the flange 17, through a corresponding openings 104 in the flange 17 and rest against the top of the flange 17 to connect stabilizing plates to the flange. The stabilizing plates provide a wider base to extend across one or more corrugations of the support 33. As desired, stiffening ribs 105 may be formed on or in the plates 100.

The fingers 102 engage the top of the flange 17 and the adjacent portion of stabilizing plate 100 engages the adjacent bottom portion of the flange 17 to provide a stable support for the base 12 as long as weight is exerted downward along longitudinal axis 16. If the base 12 is lifted upward along axis 16, the fingers 102 of the stabilizing plate 12 rotates about the edges of the openings 104 so the outer end of the plate 100 sags downward and inward toward axis 16. To prevent this a holding latch 106 preferably extends upward from the same side of the plate as the fingers 102 and the holding latch has a notch that engages an upper side of the base 12, preferably engaging an upper surface of base flange 17, to keep the stabilizing plate 100 engaged with the flange 12 and to restrain sagging of the outer edge of the plate 100 toward the longitudinal axis 16. A recess, preferably a slot 108 may extend into an edge of the base flange 17 and be located to correspond with the holding latch 106 so the holding latch can more securely engage a surface of the base 12 along a portion of the length of the slot 106.

In use, a stabilizing plate 100 is preferably but optionally fastened to two opposing sides of the base 10 to provide a broader base for the tubular passage assembly 10. The base flange 17 preferably has a recess 106 and finger openings 104 on one or more sides, preferably on opposing sides, and more preferably on each of four sides of a rectangular base, where reference to a rectangular base is used herein to include a square base.

Referring to FIGS. 1-4, 23 and 24A-24B, two separate but adjacent passageway extensions 10 may be joined together, preferably at their base flanges 17. The base 12a may have an elongated latch 110 extending away from base to engage a mating recess in a different base 12b. In the depicted embodiment the base flange 17 has latch 110 extending from the base flange 17, preferably generally horizontally, with a latching end 112 configured to engage a catching surface 114 on a different flange 12b associated with a different base 12b. The latches 110 and catching surfaces 114 are located so that if first and second bases 12a, 12b are placed against each other the latch end 112a of a first base 12a on flange 17a can engage the catch 114b on a second base flange 17b to hold the two bases 12a, 12b together. Preferably, at least one side of each base 12 has one latch 110 and one catch 114 (e.g., a recess) located toward opposing ends of the at least one side, so that the latches 110a, 110b from at least two different base flanges 17a, 17b engage a recess 114b, 114a in the other base flange 17b, 17a to fasten at least the two different base flanges together. Different types of mating projections and recesses can be used, preferably with a male engaging member on one base 12 and a female member on a second base 12. While at least two adjacent tubular passage assemblies 10 may be joined this way, the joinder still allows stabilizing plates 100 to be fastened to the sides of base 17 not joined by the latches 110 and mating catches 112.

Also shown in FIGS. 23, 24A 24B are a latching members preferably taking the form of snap lock member 116a and a mating catch 116b each located on opposing sides of sidewall 19 and located so that the snap lock members 116a on one housing 14a engage a mating catch 116b on mating housing 14b to latch the housing parts 14a, 14b together. The snap lock member and catch provide a fast connection between housing parts 14a, 14b. The member and catch 116a, 116b are located below the boss receiving the threaded fastener 18, on the split line separating the housing parts 14a, 14b. That split line is located on a plane containing the longitudinal axis 16.

Referring to FIGS. 17-20, for corrugated supports 33, a hole is cut through the corrugation support and the base 12 is positioned over the hole so the longitudinal axis 16 is centered in the hole. An extension tube 60 is passed upward through the hole in the corrugation and fastened to the bottom of the base 12. Preferably the end of the extension tube 60 having external threads 64 passes through the corrugation and engages base 12. The base 12 may have mating screw threads 120 encircling the axis 16 and tubular cylinder 22 of intumescent material and thus located outward of that cylinder 22 and accessible from the lower end of the base. The threads 120 are double lead threads, with one lead on each half 14a, 14b of the housing. To enable the screw threads 120 to extend into the base 12 and still encircle the tubular cylinder 22 of intumescent material, the retaining clip 24 has annular supporting surface 30 offset downward from tabs 26 so that the tabs have a portion extending axially to form an axial offset accommodating the bottom screw threads 120 with the distal ends of tabs 26 then extending outward through openings 28 in the cylindrical sidewalls 19 of the base 12 that encircle the tubular cylinder 22 of intumescent material.

As needed, a removable adhesive cover 122 is placed over the bottom of the base 12 to keep debris from entering the base during shipment, installation, pouring of the concrete and subsequent application of fire retardant spray. The removable adhesive cover may be removed and placed on the open end of extension tube 60 that is screwed into the bottom of the base if desired. Alternatively, separate adhesive covers or removable caps can be provided. As the extension tube 60 has internal threads 66, an additional cap 72 could be provided and used. But since the bottom opening in tube 60 that is covered by adhesive cover 122 is not normally expected to have any concrete pushing against the cover 122, it need not be as strong as cap 72 onto which concrete may be poured and onto which workers may step during use.

Figure 2:
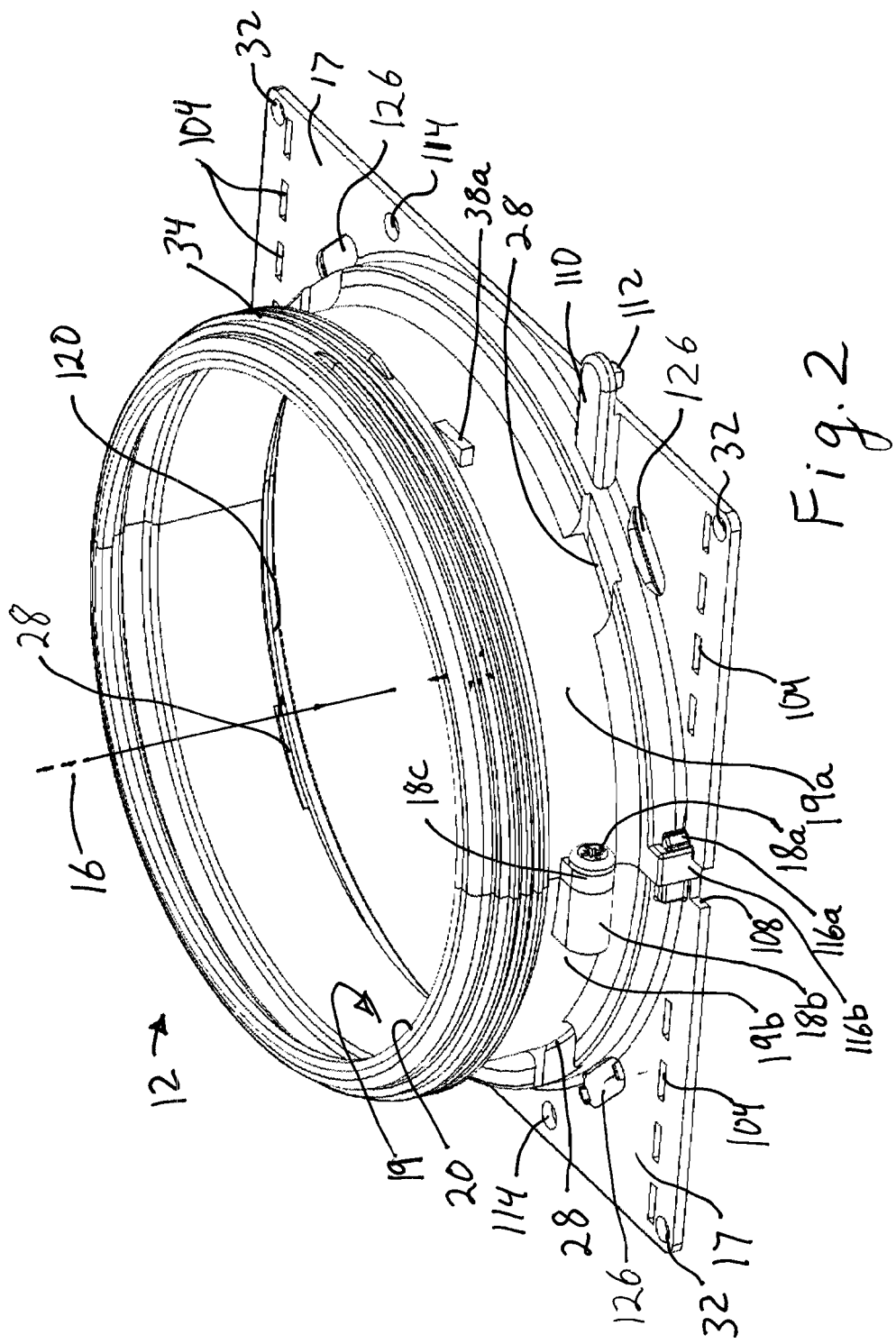
FIG. 2 is a top perspective view of a base of FIG. 1.
Figure 3:
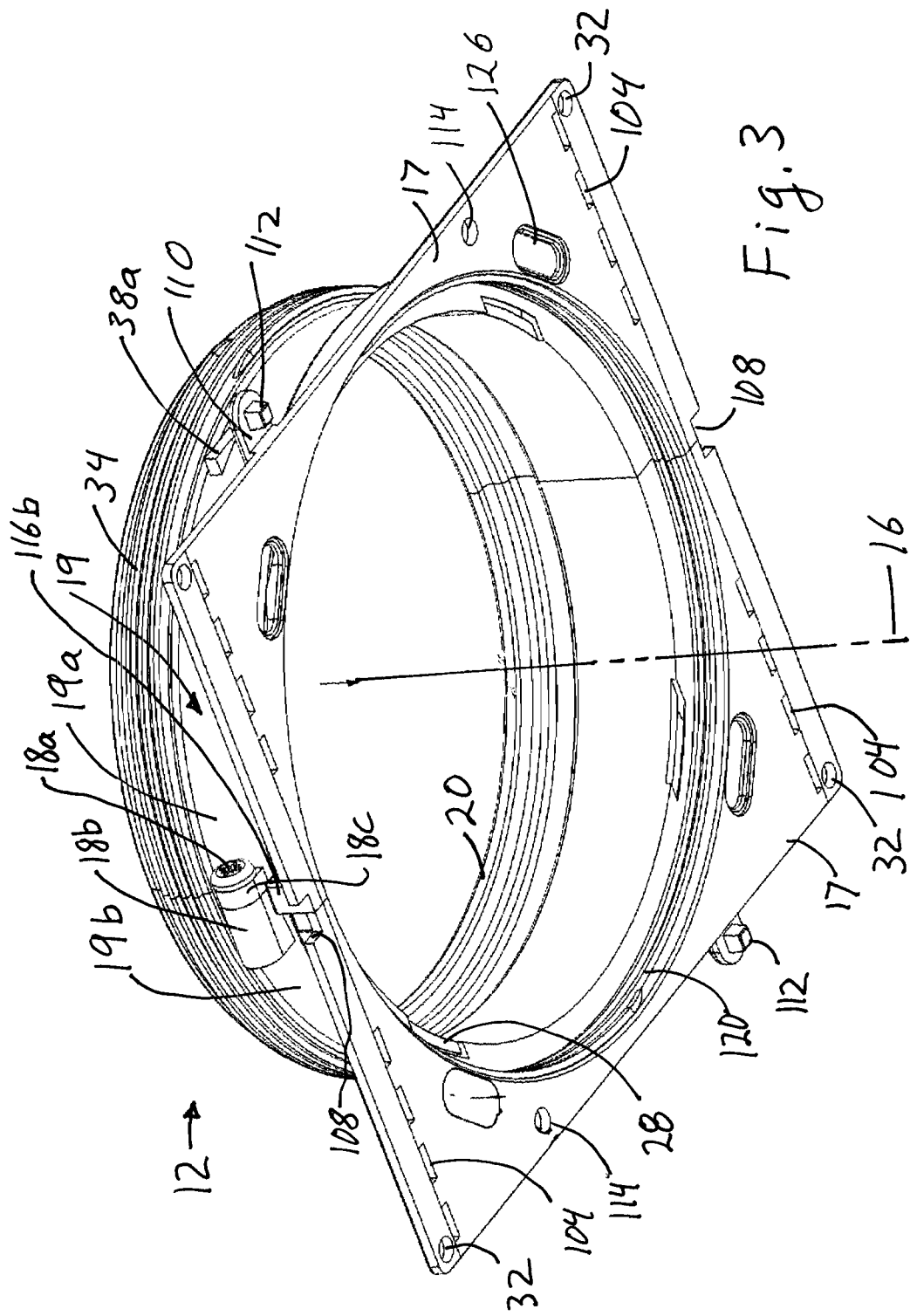
FIG. 3 is a bottom perspective view of the base of FIG. 2.
Figure 4:
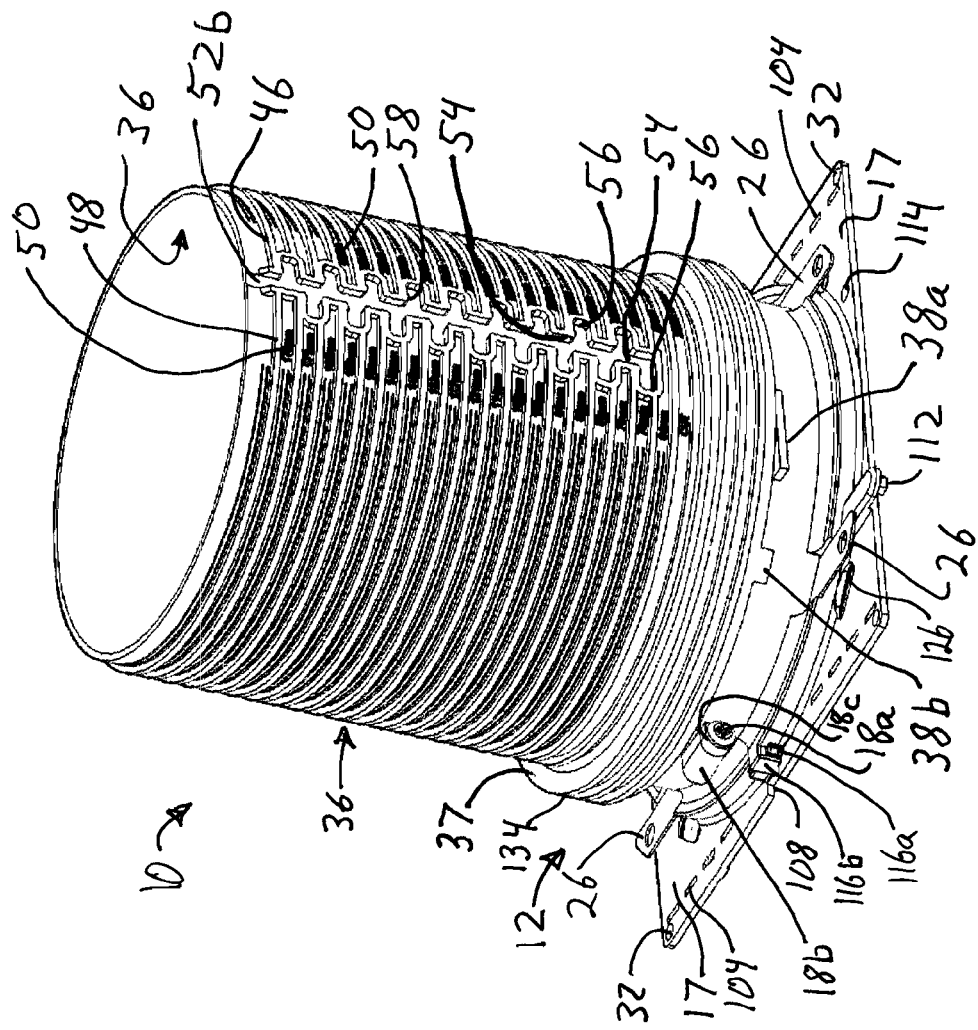
FIG. 4 is a top perspective view of an assembly including a base and a first tube of the extendable sleeve of FIG. 1.
Figure 5:
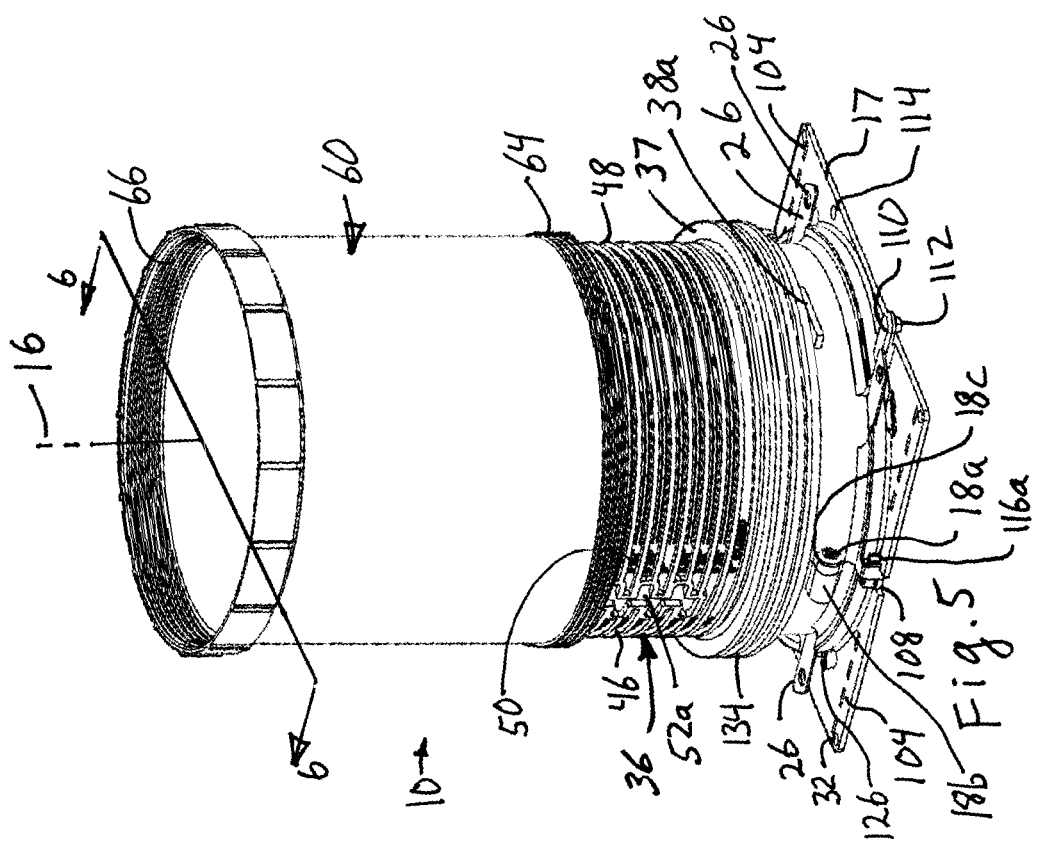
FIG. 5 is a top perspective view of the assembly of FIG. 4 further including a first extension tube.
Figure 6:
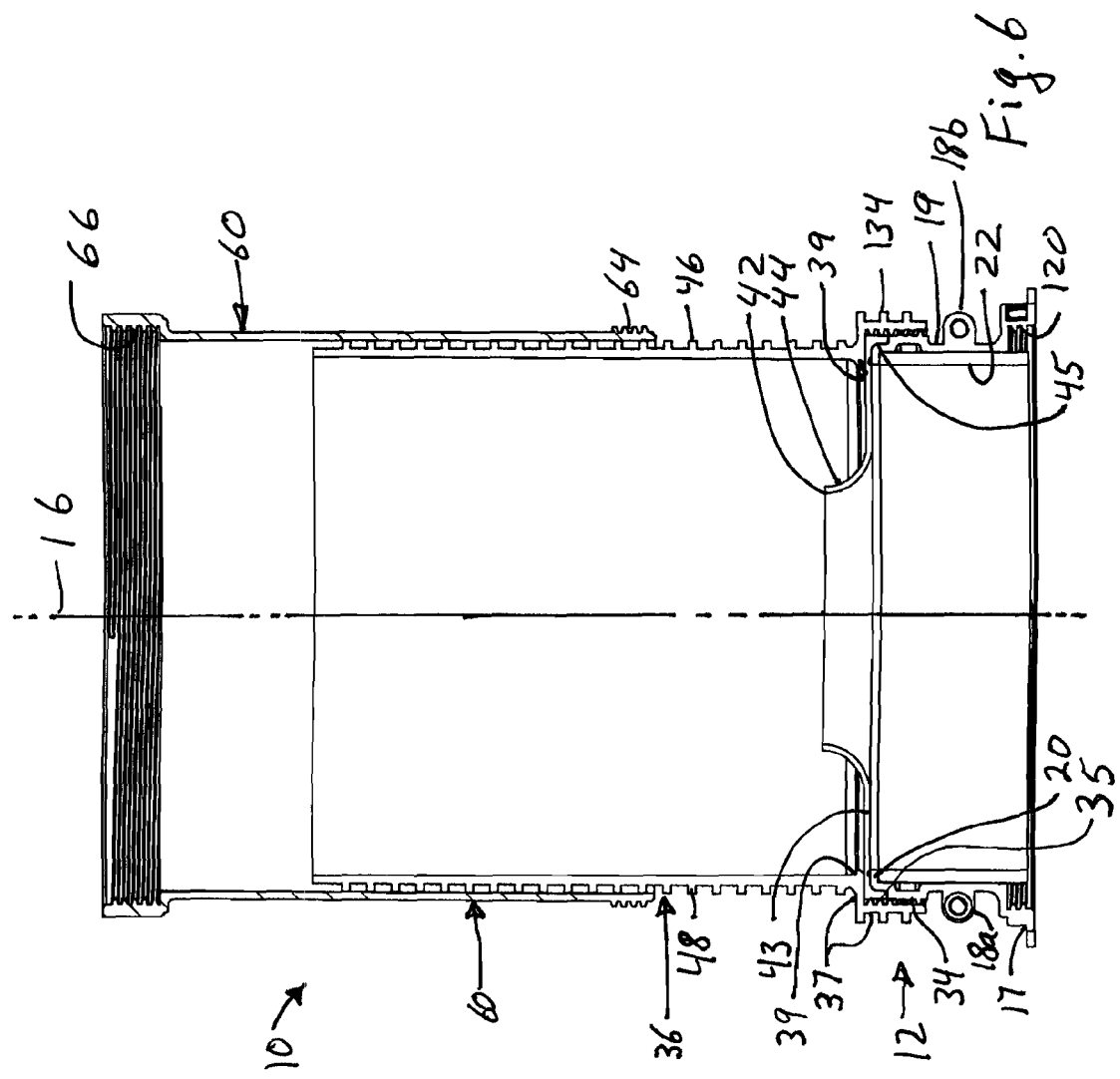
FIG. 6 is a sectional view of the assembly of FIG. 5, taken along 6-6 of FIG. 5.
Figure 7:
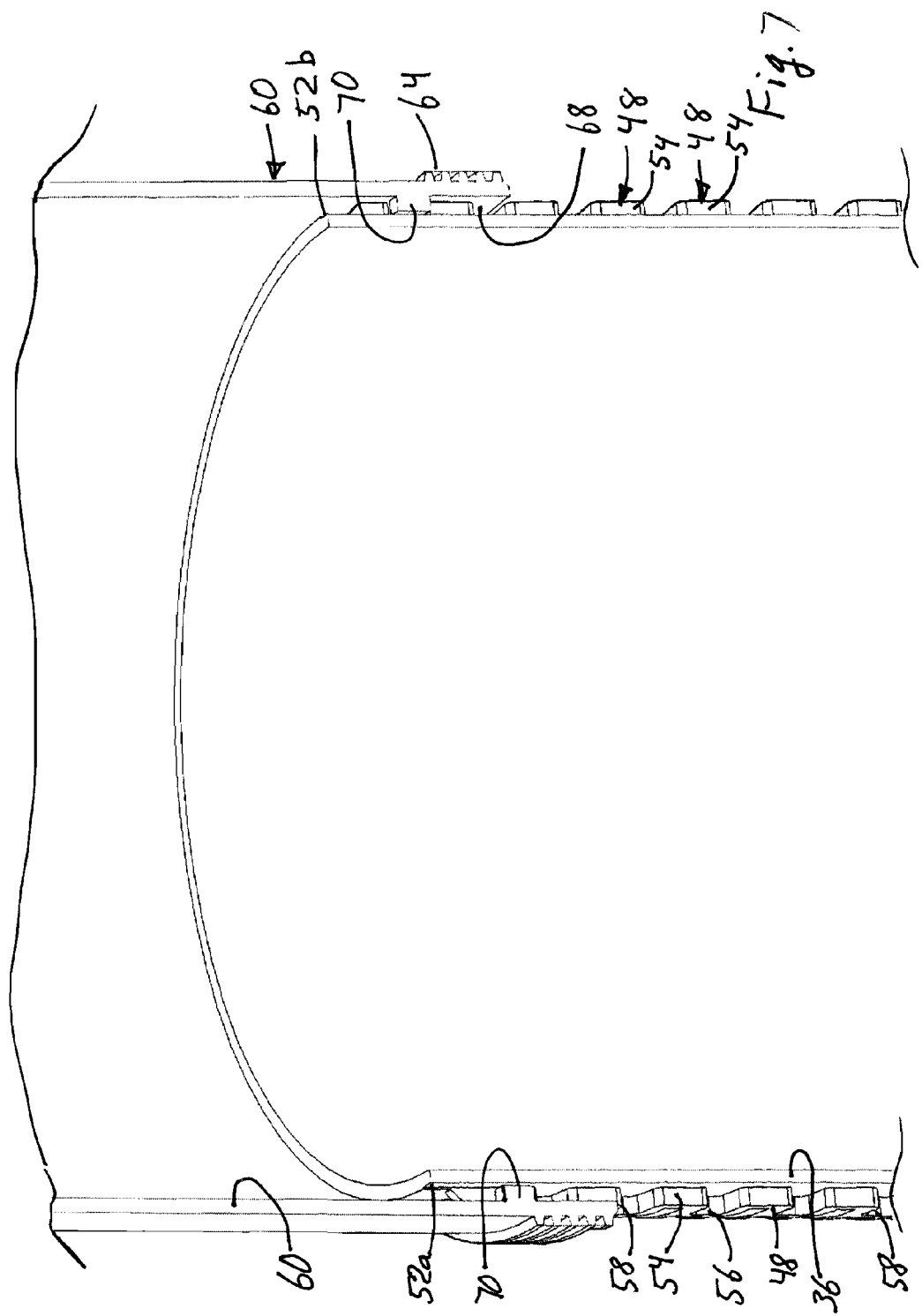
FIG. 7 is a partial perspective view of a portion of FIG. 6 showing the juncture of the first tube and the extension tube.
Figure 8:
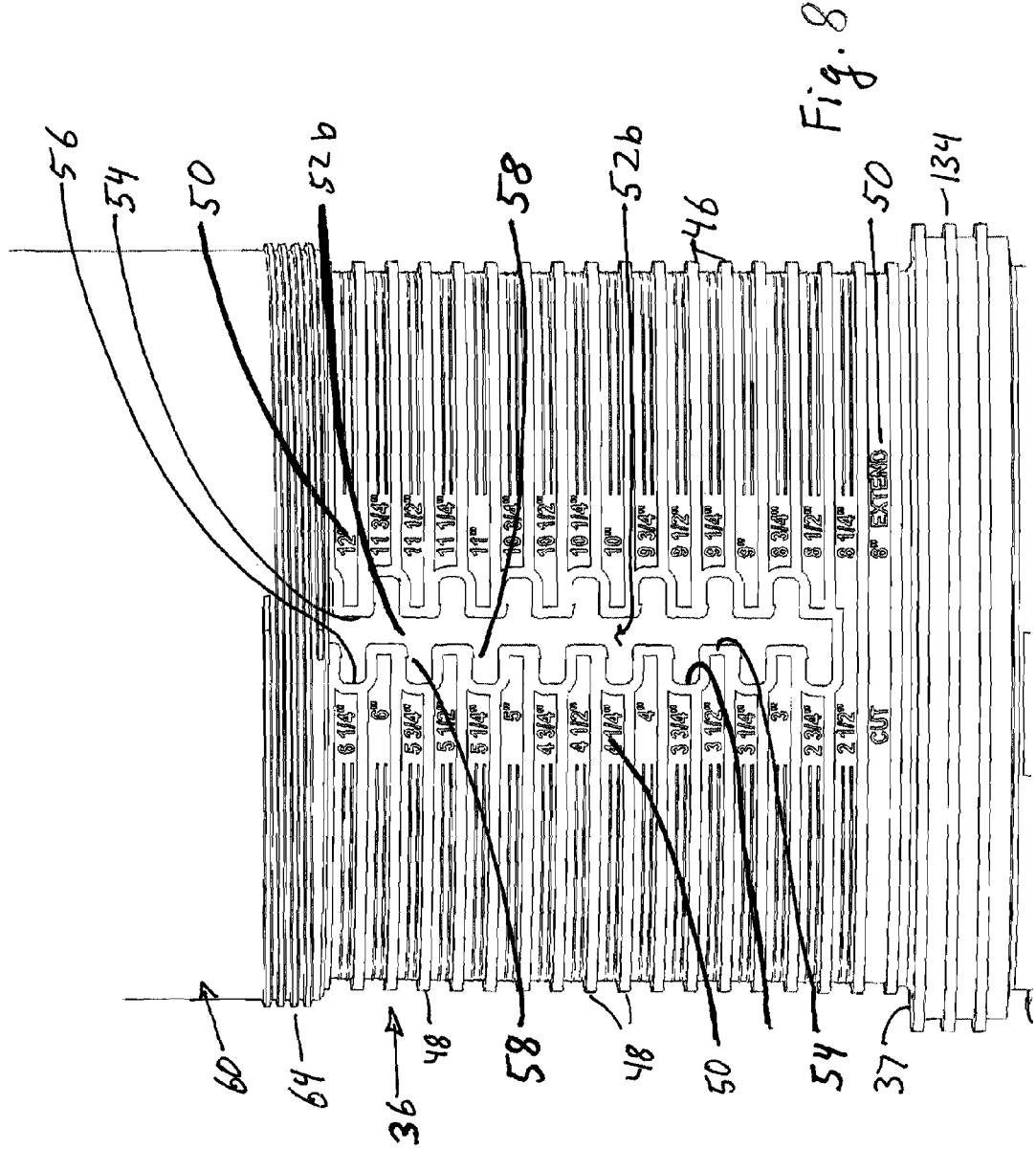
FIG. 8 is a partial perspective view of a portion of FIG. 5 showing the juncture of the first tube and extension tube.
Figure 18:
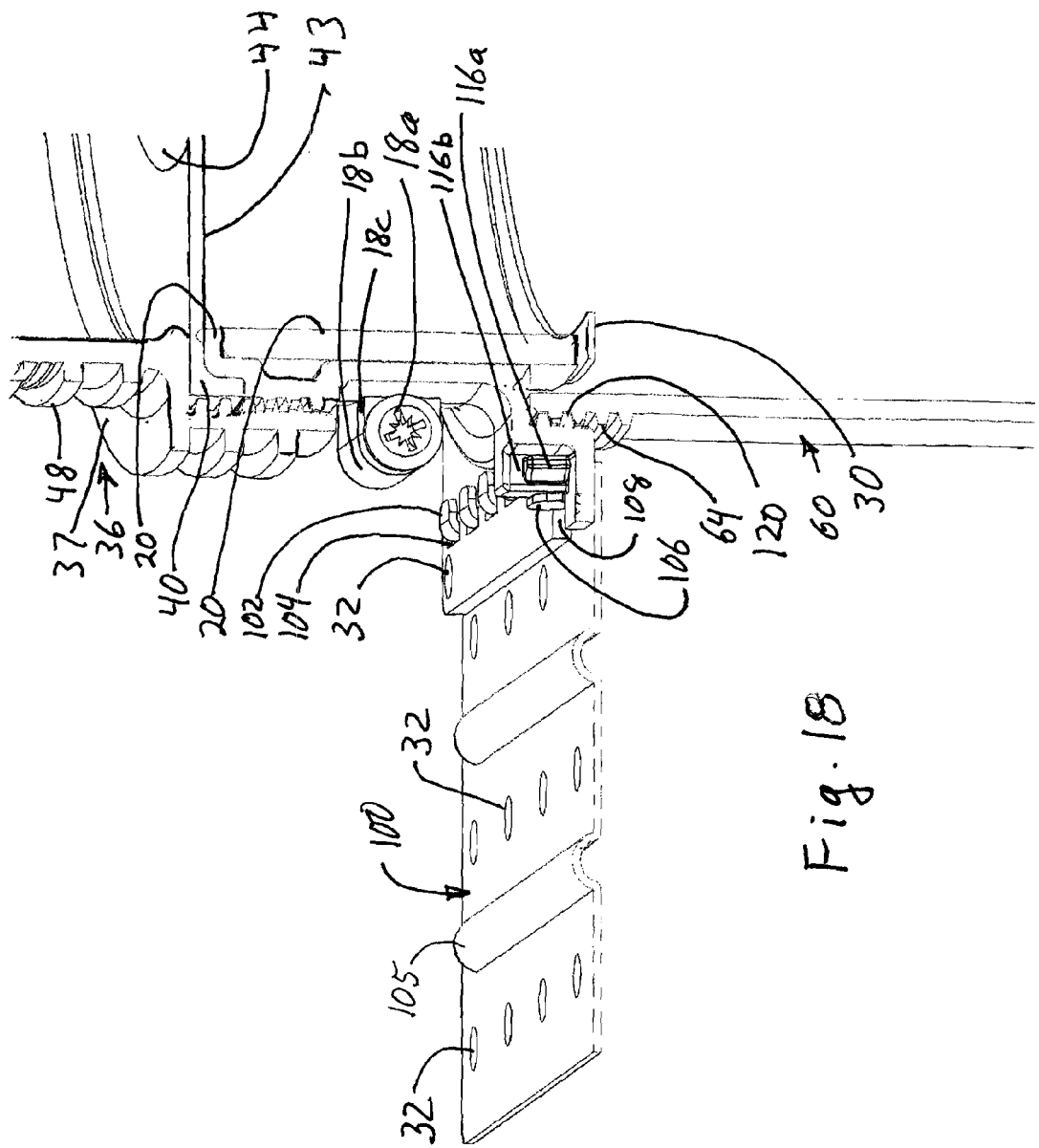
FIG. 18 is a perspective view of the juncture of a corrugated form stabilizing plate with the base of FIG. 17.

Referring to FIGS. 2 and 17-20 and especially to FIGS. 2 and 18, the base flange 17 may have two removable tabs 124a, 124b installed into or formed in the base, preferably in flange 17. One tab 124a may indicate metal and the other tab 124b may indicate plastic. If the shaped diaphragm 40 is selected for use with metal pipe the plastic tab 124b is removed so that a user can see from looking at the remaining tab 124a on the base 12 that the passage tube is intended for use with metal pipes. If the shaped diaphragm 40 is selected for plastic pipes then the metal tab 124a is removed so that a user can see from looking at the remaining tab 124b on the base 12 that the passage tube assembly is intended for use with plastic pipes. Tabs 124 may be scored, perforated or otherwise surrounded by weakened material so the selected tab can be punched out, broken off or otherwise removed. Alternatively, the tabs 124 may be separate pieces that are selectively pressed into mating openings 126 in flange 17. This provides a way to readily identify at the factory which type of pipe with which the passage tube assembly is to be used.

Figure 25B:
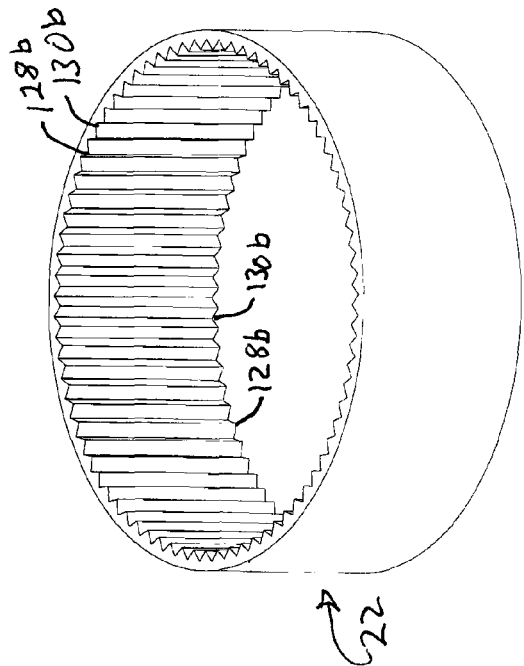
FIG. 25b is a perspective view of a tubular cylinder of intumescent material having undulating a smooth outer surface and ridged inward facing surface having triangular ridges.
Figure 25D:
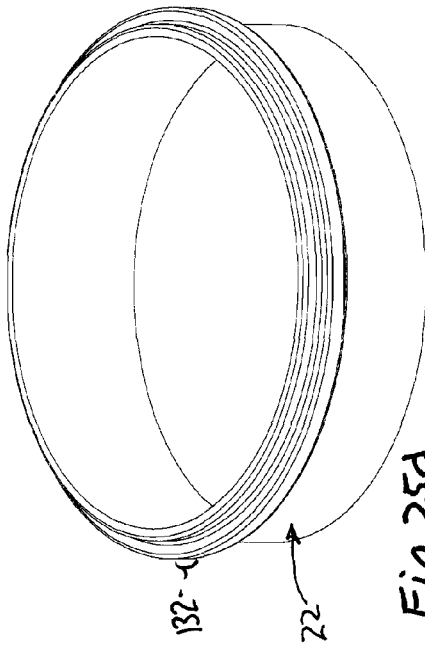
FIG. 25d is a perspective view of a tubular cylinder of intumescent material having a shaped upper and outer surface and a smooth interior surface.
Figure 25A:
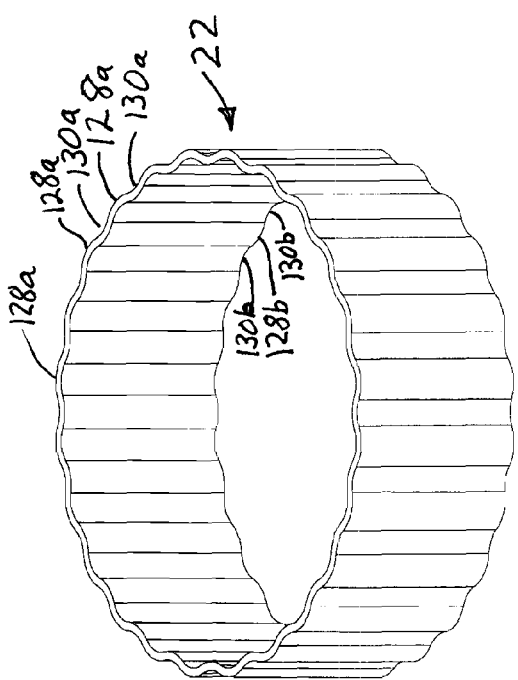
FIG. 25a is a perspective view of a tubular cylinder of intumescent material having undulating sides.

Referring to FIG. 25a, the tubular cylinder 22 of intumescent material is made of a material that expands significantly under heat so as to block off the space between the pipe and the adjacent parts of the expandable sleeve 10 which are encased in concrete. Since plastic pipes sometimes melt under sufficient heat, the tubular cylinder 22 of intumescent material may need to expand to fill more than the space between the cylinder 22 and the adjacent pipe as it may need to compress a melting and flexible walled pipe to ensure blockage of gases and water through the expandable sleeve 10. In order to help the tubular cylinder 22 of intumescent material expand sufficiently it is believed advantageous to provide the cylinder 22 with undulating sides forming alternating ridges 128 and valleys 130, with a ridge 128a on an outer surface of the cylinder 22 being opposite a valley 130b on an inner surface of the cylinder 22, and a valley 130a on the outer surface of the cylinder 22 being opposite a ridge 128b on the inner surface.

The height of the undulating ridges 128 relative to the adjacent valley 130, and the spacing of the ridges 128 will vary with the diameter of the tubular cylinder 22 of intumescent material and the amount of desired inward expansion and the type of intumescent material used. The undulations are evenly spaced to ensure more even expansion. Cylinders 22 with an outer diameter of about 2 inches and a wall thickness of about ⅛ inch, about 24 undulations and an inner and outer diameter difference of about ⅜ of an inch are believed suitable for use with a pipe having an outer diameter from about ⅝ inch to about 1.3 inches. Cylinders 22 with an outer diameter of about 3¼ inches and a wall thickness of about 0.14 inches, about 24 undulations and an inner and outer diameter difference of about ⅜ of an inch are believed suitable for use with a pipe having an outer diameter from about 1.4 to about 2.5 inches. Cylinders 22 with an outer diameter of about 4¼ inches and a wall thickness of about 0.13 inches, about 24 undulations and an inner and outer diameter difference of about ⅜ of an inch are believed suitable for use with a pipe having an outer diameter from about 2.6 inches to about 3.5 inches. Cylinders 22 with an outer diameter of about 4.5 inches and a wall thickness of about 0.13 inches, about 24 undulations and an inner and outer diameter difference of about ⅜ of an inch are believed suitable for use with a pipe having an outer diameter from about 3⅛ inch to about 4.5 inches. Cylinders 22 with an outer diameter of about 7⅜ inches and a wall thickness of about 0.13 inch, about 24 undulations and an inner and outer diameter difference of about ⅜ of an inch are believed suitable for use with a pipe having an outer diameter from about 5⅛ inch to about 6⅝ inches. A preferred intumescent material for these undulating cylinders 22 is as described in U.S. Pat. Nos. 6,790,893 and 6,645,278.

Figure 25C:
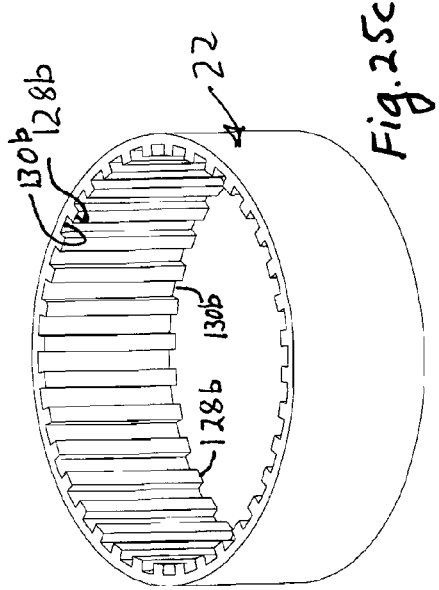
FIG. 25c is a perspective view of a tubular cylinder of intumescent material having undulating a smooth outer surface and ridged inward facing surface having rectangular ridges
Figure 26A:
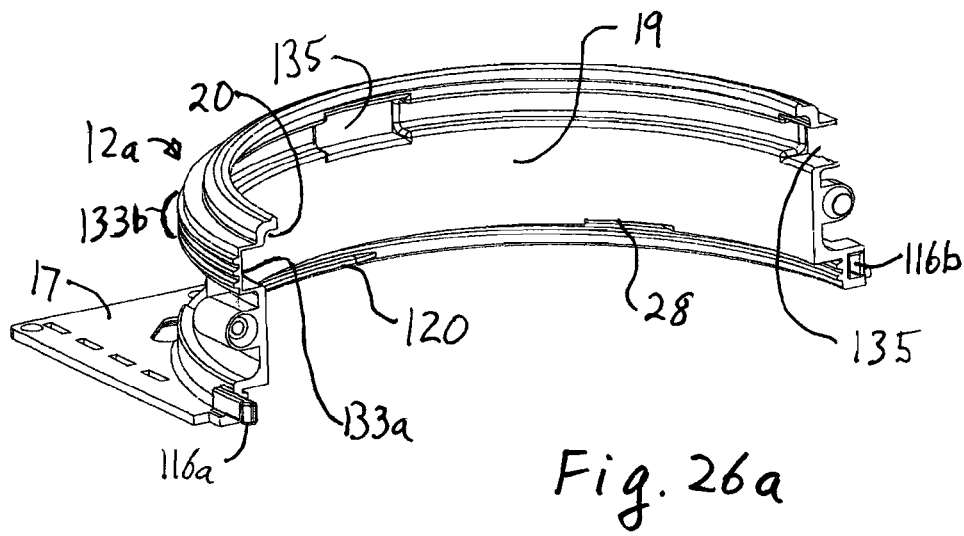
FIG. 26a is a perspective, sectional view taken along section 26a-26a of the base of FIG. 26b.
Figure 26B:
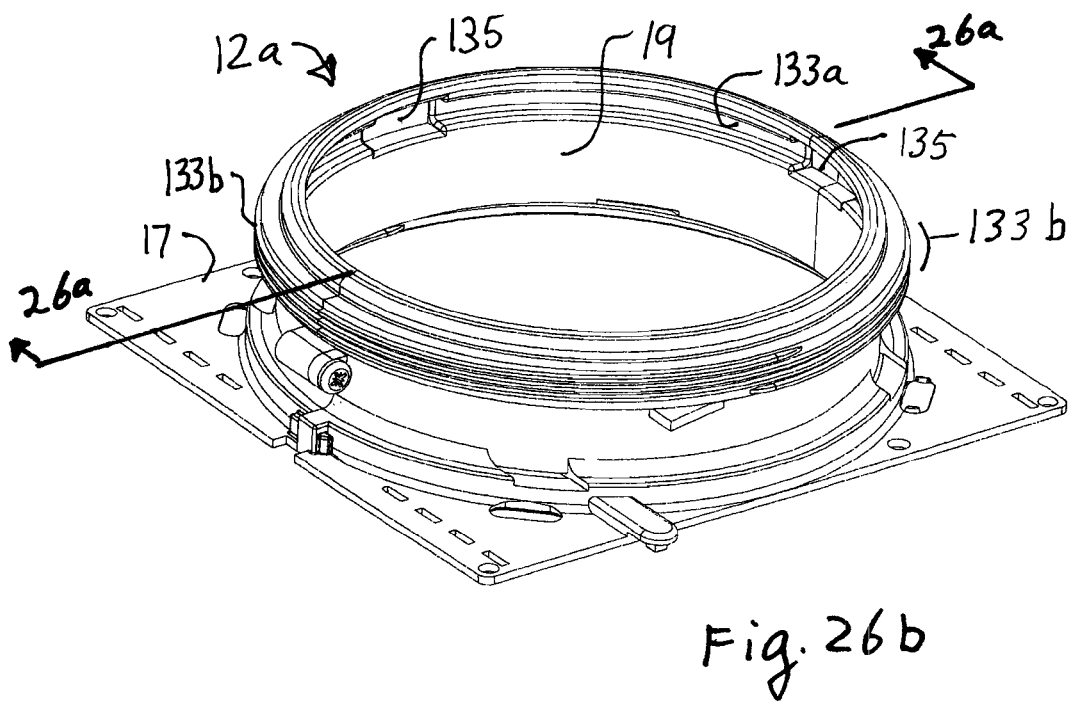
FIG. 26b is a perspective view of a further embodiment of the base of FIG. 1.

The undulations on tubular cylinder 22 need not be smoothly undulating as in FIG. 25a, nor need the undulations extend from opposing sides of the wall of the cylindrical tube 22. As shown in FIG. 25b, the undulations may be triangular in cross-sectional shape extending inward to form ridges 128b and valleys 130b. The outer surface of tube 22 is smooth. FIG. 25c shows an intumescent cylindrical ring 22 having longitudinal ribs on its inner surface where the ribs 128 and valleys or recesses 130 where the ribs have a rectangular cross-sectional shape, as do the valleys. The depicted ridges and valleys 128, 130 are aligned with longitudinal axis 16, but could be circumferentially aligned, or inclined. The outer surface of the tubular cylinders 22 in FIGS. 25b, 25c are smooth, but the outer surfaces could have the same undulations as the inner surface, or any combination of the depicted undulations.

FIG. 25d shows an intumescent tubular cylinder 22 having a smooth inner wall and a shaped outer wall at the upper edge of the cylinder 22. In particular, the tubular cylinder 22 has an outwardly extending rectangular flange 132 shaped to mate with a corresponding recess 133a in the sidewall 19 of the modified base 12a which forms an outward extending flange 133b on the outside of the modified base 12a. Openings 135 are formed in the sidewall 19 at the location of flange 133b and recess 133a. The shaped flange 132 on the intumescent tube 22 fits into the recess 133a on the sidewall 19 of modified housing 12a and extends across openings 135.

During use, the openings 135 allow heat from a fire to directly impinge on the intumescent cylinder 22 to more easily precipitate rapid expansion of the cylinder 22. Further, the intumescent flange 132 and base flange 133a provide not only a labyrinth seal restricting moisture passage between the base 12a and concrete encasement, but provide for a greater concrete interlock resisting pulling the tubular passage 10 through the concrete deck along the longitudinal axis 16. Moreover, the openings 135 allow the intumescent material of tube 22 to expand to directly abut the encasing concrete to further interlock the expanded intumescent material to the concrete during heated expansion and that helps maintain the blockage of the tubular passage 10 from the expanded intumescent material during use. Moreover, the enlarged, outward extending flange 132 of intumescent material may expand outward as the plastic housing 12b melts during a fire, further interlocking the expanded intumescent material to the concrete during heated expansion and that helps maintain the blockage of the tubular passage 10 from the expanded intumescent material during use. While two openings 135 are shown, any number of openings may be used.

The tubular cylinder 22 of intumescent material is preferably extruded or molded at a temperature below that at which the material begins to expand significantly. Alternatively, the material may be used in flat strips that are wrapped around molds having the desired cylindrical shape, or having an undulating walled cylindrical shape. Still further, strips of material may be impressed on opposing sides to form undulations and the strip then formed into a cylindrical shape. If formed of strips, the opposing ends of the strips may be left separate, but adjacent each other to form the cylindrical shape with setting of the material retaining that shape, or the adjacent ends may be fastened by various fasteners such as clips, staples, stakes, adhesive, tape, etc. to maintain the shape. The strips of material formed into a cylinder may also have the outer surface wrapped with and fastened to a cylindrical tube of material to maintain the shape.

For assembly, the appropriate base 12, tubular cylinder 22 of intumescent material, retaining clip 24 and diaphragm seal 40 are selected for the desired type of pipe and range of pipe sizes. The tubular cylinder 22 of intumescent material is placed into the annular base 30 of clip 24 and the tabs 26 are inserted through the slots 28 in one half of housing 14 to wedge the cylinder 22 into place against the lip 20 and against the interior of the corresponding sidewall 19. Then the other half of the housing 14 is then aligned with the remaining tabs 26 and the two parts of the housing 14a, 14b are joined and fastened together in abutting relationship to form a base assembly 12. The tabs 26 on retaining clip 24 are bent to inhibit removal and lock the tubular cylinder 22 of intumescent material in place against vertical motion along one direction of longitudinal axis 16. Advantageously, bending tabs 26 also offer increased security in retaining the assembly 10 within the poured concrete, as for example, if the plastic parts are exposed to fire or fire-fighting activities such as sprays of high pressure water. Somewhere along the assembly process, the appropriate tab 124 is either removed or inserted, as the case may be, so that the tab in place on the tubular passageway 10 indicates whether the assembly 10 is for use with metal or plastic pipes, resulting in a base assembly with visible indicia indicating the type of pipe application suitable for use with the base assembly.

After the base assembly 12 is completed, the selected diaphragm seal 40 is then placed on top of the lip 20 of base 12, and the first tube 36 is attached to the base 12, preferably by engaging double lead threads 35 on the tube 36 with mating threads 34 on the base 12. The stops 38a, 38b abut to limit rotation with the parts being sized so the limit stops 38a, 38b engage when the outer periphery of diaphragm seal 40 is securely clamped between base 12 and first tube 36, and preferably clamped between lip 20 on base 12 and inward extending flange 39 on the first tube 36. The limit stops 38a, 38b also locate the distal end of first tube 36 a known distance from the base flange 17, preferably a known distance from the bottom of the base flange 17, with the visible indicia 50 on the tube 36 reflecting distances along longitudinal axis 16 from that base flange 17. The base assembly may include the base 12, retainer 24 and intumescent tube 22 and it may be shipped separately or as part of a kit. The base assembly, diaphragm seal 40 and first tube 36 may be shipped as a separate assembly or as parts of a kit, with or without cap 72 and filament 82 and its mount 84.

Figure 14:
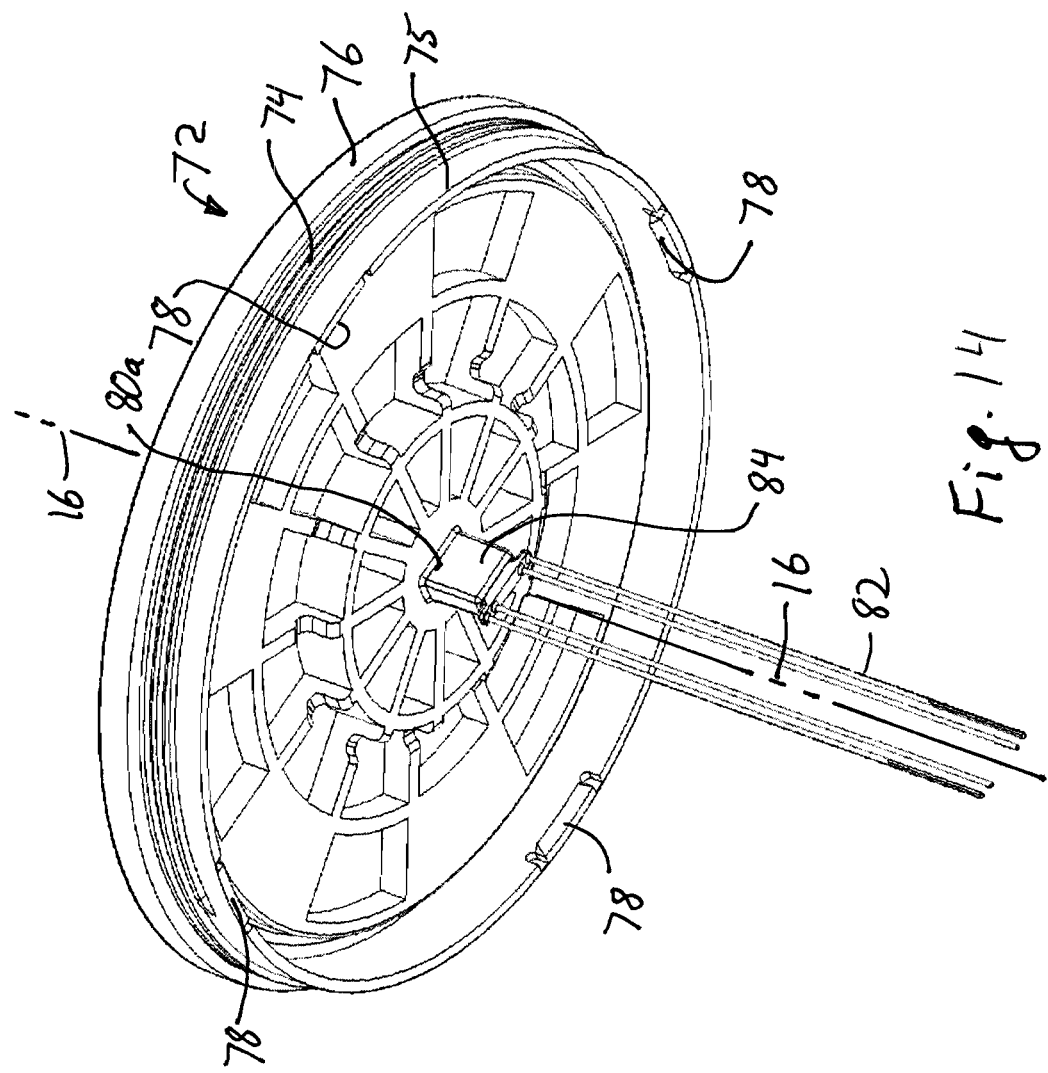
FIG. 14 is a bottom perspective view of the cap of FIG. 11, with locating filaments in a shipping position.
Figure 15:
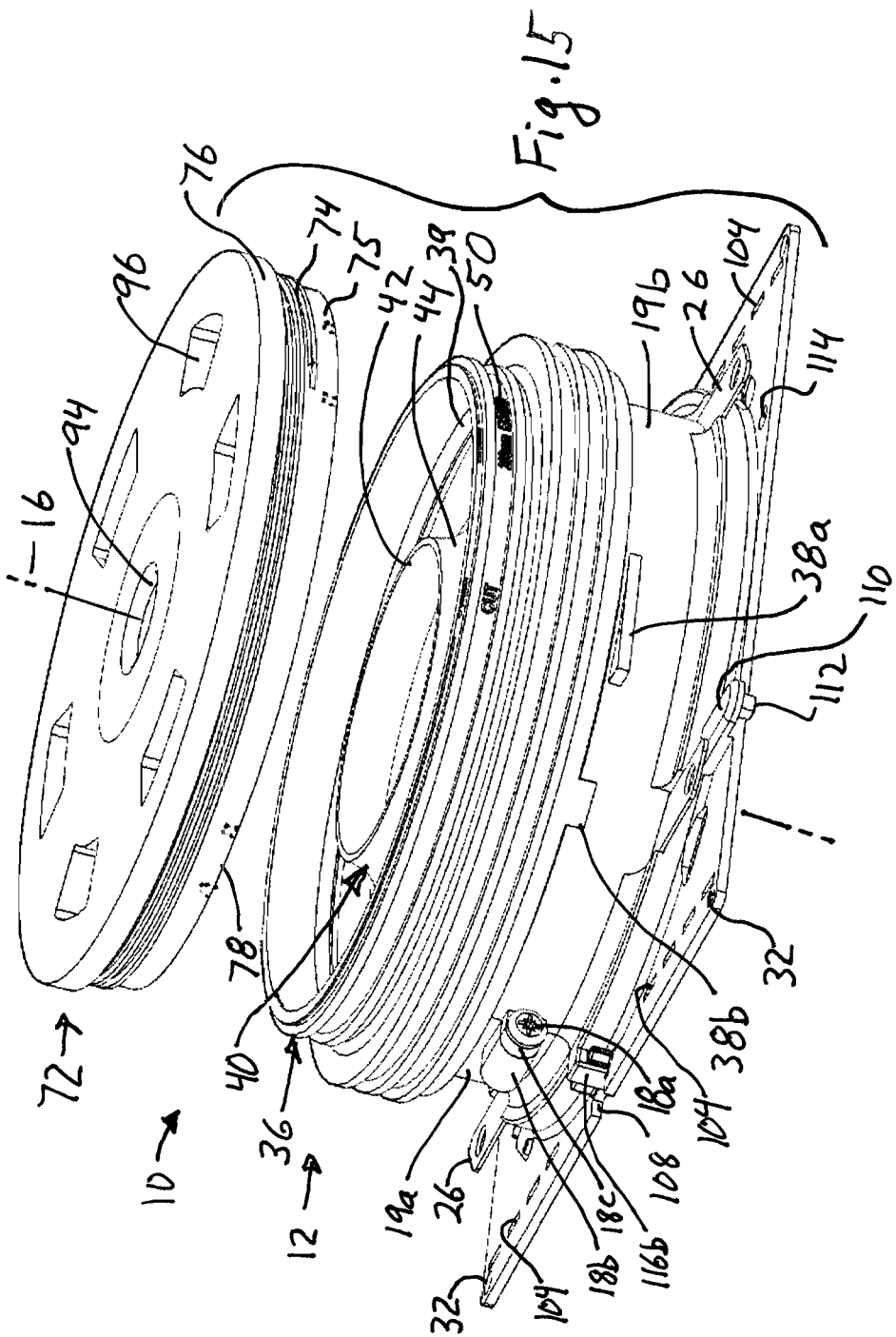
FIG. 15 is a top exploded perspective view of a base, first tube and cap of FIG. 1 with the first tube cut to a very short length.
Figure 16:
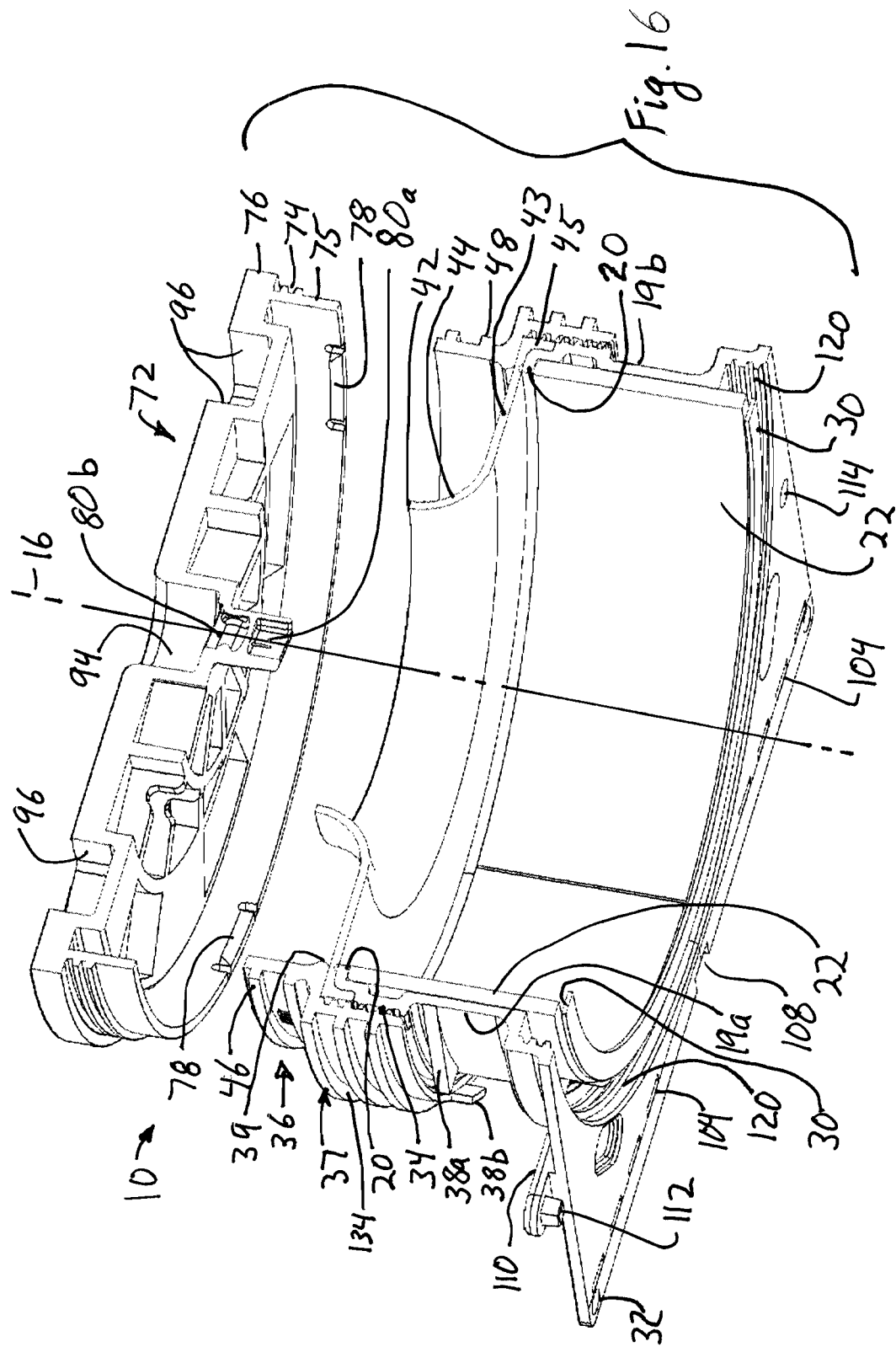
FIG. 16 is a bottom, exploded, perspective sectional view of the base and cap of FIG. 15.
Figure 17:
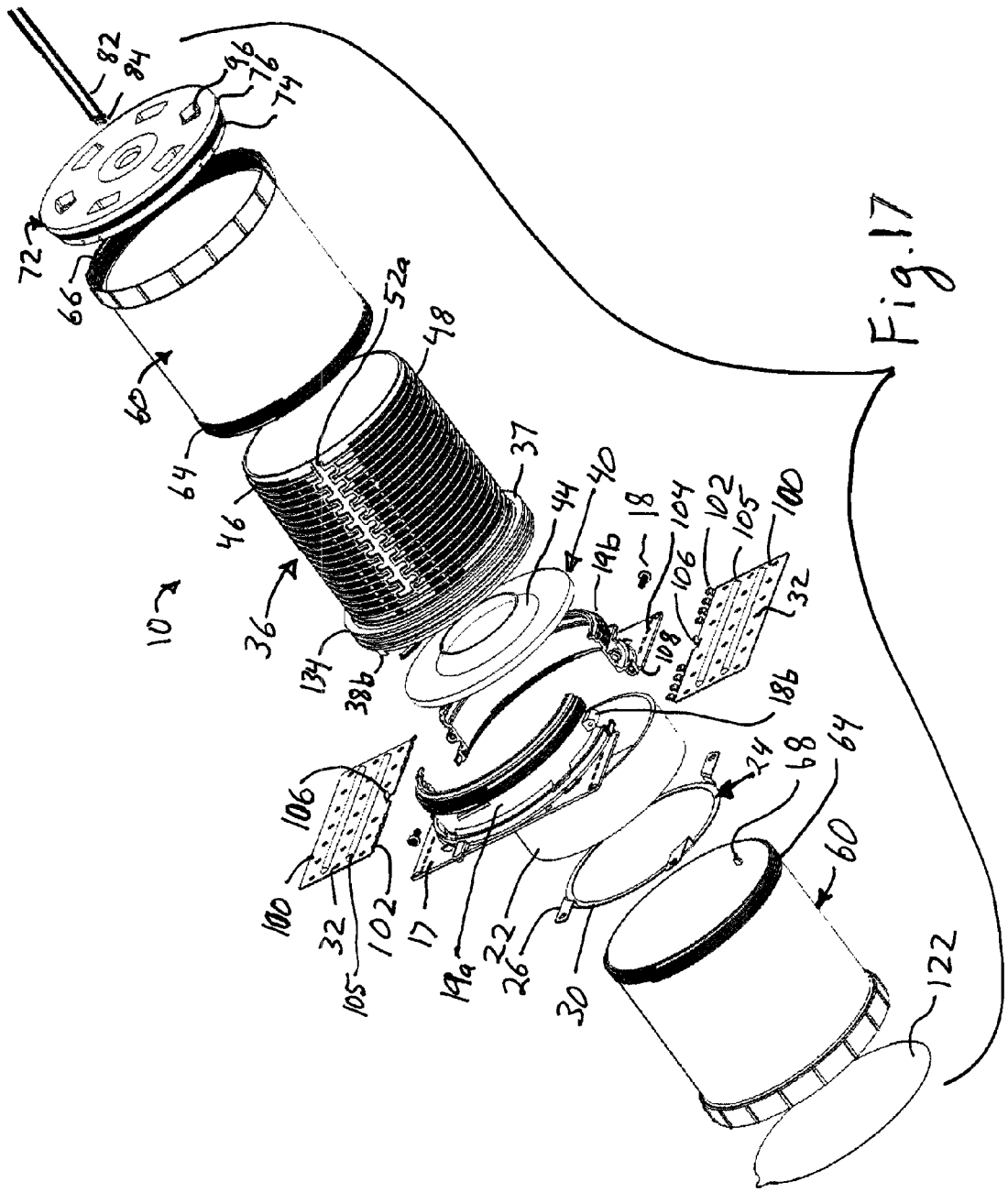
FIG. 17 is a top, exploded perspective view of a the extendable sleeve of FIG. 1 with a bottom extension tube.

But preferably a first extension tube 60 is fit over the first tube 36 and fastened thereto by lugs 70 sliding along channels 52 and rotated to engage ridges 46, 48, with cap 72 fastened to the distal end of the extension tube 60 as in FIG. 12. The filament base 84 and filament(s) 82 are preferably connected inside the assembly (FIGS. 12, 14). The open bottom in base 12 may be left open, or covered by another cap 72 or by a removable cap 122. Additional extension tubes may be shipped with this assembly. The base assembly may be shipped by itself, or shipped as a kit with the first tube 36, cap 72, cover 122, one or more extension tubes 60 and one or more (preferably 2 or 4) stabilizing plates 100, or any combinations thereof.

A user takes the assembled base 12 and verifies it is for the type of pipe intended for use with the passage assembly 10 by looking at tabs 124. The user then adjusts the first tube 36 to the desired length by cutting the tube 36 between ridges 46, 48 using the visible indicia 50 as a guide, or by adjusting the relative position of the first extension tube 60 on the first tube 36, again using visible indicia 50 as a guide. As needed, additional extension tubes 60 may be added as described above to increase the length, with the position of the first extension tube 60 relative to the first tube 36 reflecting fine adjustments on the fixed length provided by the joined extension tube(s) 60. After adjusting the length, the user fastens the base 12 to the support 33 onto which concrete is to be poured. As needed, the user may attach one or more stabilizing plates 100. Typically, fasteners such as screws (for corrugated supports 33 and nails for wooden supports 33) pass through holes 32 in the flange 17 or stabilizing plates 100 to fasten the passage tube assembly 10 to the support 33. If a corrugated support 33 is used, a hole is cut through the support 33 and the user fastens an extension tube to the bottom of base 12 by removing any protective bottom cover (e.g., cap 72 or cover 122) and then engaging threads 64 of extension tube 60 with threads 120 in the bottom of base 12 so the extension tube depends from the base 12. The end of extension tube 60 is then passed through the hole in the support 33 with the distal end of the depending extension tube 60 covered by cap 72 or cover 122, or open as the user desires. The flange 17 and/or stabilizing plates 100 are then fastened to the corrugated support 33.

Shortly before concrete is poured, the cap 72 is removed from the top end of the passage tube assembly. The base 84 and filament(s) 82 are removed from the bottom of the cap and affixed to the top of the cap 72, as shown in FIGS. 9-11, 17, 20 and 22 and the cap is then put back on the tube assembly so the locating filaments stick upward. Concrete is then poured, with the tubular passage assembly 10 forming a casing entrained in the concrete. The ridges 46a, 46b and the various projections and changes in contour on the base 12 and tubes 36, 60 help embed the parts in the concrete so as to inhibit removal. Optional ridges 134 may extend outward from the stepped portion 37 of the first tube 36 to help embed the parts in the concrete, and act as labyrinth seals against the passage of moisture between the passage tube assembly 10 and the concrete encasement. The depending extension tube 60 helps prevent the concrete from entering the tubular assembly 10 from between the top and bottom of the corrugations in the support 33.

After the concrete is finished and hardened sufficiently, the location of the passage assembly 10 may be identified by the filament(s) 82 sticking above the concrete. The cap 72 may be removed by inserting the jaws of a channel lock pliers in the wrenching recesses 96 and rotating the cap. The cover 122 or cap may be removed from the bottom of base 12 or the depending extension tube 60 fastened to the base. The workers can then pass pipes through the tubular passage assembly by passing them upwards through the opening 42 of flexible diaphragm seal 40. The flexible, funnel shaped seal 40 allows some variation in pipe diameter and location so as to make it easier for workers to install the pipes between floors and to accommodate misalignments.

The ridges 46, 48 extend radially outward from the cylindrical first tube 36. The ridges 46, 48 extend for a majority of the length of the first tube, and preferably extend the entire length or substantially the entire length of the tube from the stepped portion 37 to the upper distal end of the tube. By substantially the entire length is meant about 90 percent or more of the specified length. The ridges 46 are axially offset from the ribs 48, such that the distance between ribs 46 may be measured in inches and the distance between ribs 48 may be measured in millimeters or centimeters. The space between the adjacent ridges 46, 48 is preferably the same within both sets of ridges 46, 48. The space between the adjacent ridges 46, 48 is preferably larger than the width of the respective ribs measured along the longitudinal axis 16, with the space advantageously being about the width of a saw blade used on construction sites.

Except for the seal 40, the various other parts of the passage tube assembly 10 are preferably made of plastic, with ABS, PVC or polypropylene plastic being preferred. The extension tubes 60 and first tube 36 are preferably each about 5.5 inches long and overlap about one inch with the base 12 in releasable attachment thereto. The base 12 adds about two inches to the height of the assembly so that a base 12 and first tube 36 are about 7.5 inches from the bottom of base flange 17 to the distal end of the first tube 36, with a cap adding about ⅛ inch of additional height that is removed after concrete is poured. Adding one extension tube 60 increases the assembly height to about 12 inches from the deck or support, upon which the bottom surface of base flange 12 rests. While the extension tube 60 is about 5.5 inches long, there is about 0.5 inches of engaged threads 64, 66 on the two mating parts. Thus, the distance from the bottom of base 12 to the top of the assembly with tubes 36, 60 represents the length of the passage from the upper surface of the deck If a fire occurs, the tubular cylinder 22 of intumescent material will expand under a suitable temperature to block off air flow through the inside of the tubular passage assembly 10. If flooding occurs, the flexible diaphragm seal 40 seals against the pipe passing through opening 42 of the seal 40, with the initial water pressing the upwardly extending funnel portion 44 against the pipe so as to improve the seal and increase the weight of water needed to invert the seal and/or allow leakage past the seal Although these inventions have been disclosed in the context of certain preferred embodiments and examples, it will be understood by those skilled in the art that the present inventions extend beyond the specifically disclosed embodiments to other alternative embodiments and/or uses of the inventions and obvious, modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A kit for forming a tubular passage through a poured concrete deck, comprising:
    a base assembly having a base formed of two opposing housing portions fastened together to form a housing having a cylindrical sidewall portion extending along a longitudinal axis and containing a tubular cylinder of intumescent material adjacent the cylindrical sidewall portion, the tubular cylinder of intumescent material encircling the longitudinal axis and having its motion limited in a first direction along the axis by the housing and having movement in an opposing direction along the axis limited by a clip engaging the housing;
    a flexible diaphragm seal having a central opening selected to seal against a range of pipe diameters during use, the seal having a funnel portion between an outer periphery and the central opening, wherein the funnel shape includes a sidewall forming the central opening which sidewall is curved in cross-section toward the longitudinal axis and forms a circle of revolution; and
    a first cylindrical tube configured to fasten to a top of the base assembly during use and encircle the longitudinal axis during use, the first tube and base being configured to clamp a periphery of the flexible diaphragm between them sufficiently to form a fluid tight seal.

2. The kit of claim 1, wherein the first tube has a plurality of outwardly extending, equally spaced ridges on an exterior surface thereof and extending along a majority of a length of the first tube and extending less than a majority of a circumference of the first tube, and further including:
    a first cylindrical extension tube having a first end configured to fit over the first tube and having at least one lug configured to engage a selected one of the plurality of outwardly extending ridges to releasably fasten the first extension tube to the first tube.

3. The kit of claim 2, wherein the first tube fastens to the top of the base by a double lead threaded connection, the base having internal, double lead threads on a bottom thereof which threads encircle a lower portion of the tubular cylinder of intumescent material and are configured to threadingly engage mating threads on the first cylindrical extension tube.

4. The kit of claim 2, further comprising a cap having a skirt having an inner surface configured to releasably engage the ridges and having an outer surface configured to releasably engage an inward facing surface of the cylindrical extension tube, the cap having an exterior surface facing along the longitudinal axis which exterior surface contains a recessed connector configured to releasably engage a base from which extends at least one filament having a length greater than about one inch, the base releasably engaging the filament in the recess and below the outer surface of the cap.

5. The kit of claim 2, further comprising a flexible filament having a base and a length of about one to several inches long, and a cap having a skirt sized to engage a distal end of the first cylindrical tube, the cap having an exterior surface facing along the longitudinal axis and containing a recess configured to releasably receive the base of the filament.

6. The kit of claim 5, wherein the cap skirt has an inner surface configured to releasably engage the ridges and has an outer surface configured to releasably engage an inward facing surface of the cylindrical extension tube.

7. The kit of claim 1, wherein the funnel portion has a curved sidewall.

8. The kit of claim 1, further including a cap for a distal end of the first cylindrical tube, the cap having an exterior surface facing along the longitudinal axis and an opposing interior facing surface, the kit further including a flexible filament having a base and a length of about one to several inches long, the cap having a recess in the exterior surface of the cap containing a connector to releasably connect to the base of the filament within the recess, the cap having a projection extending from the interior surface of the cap forming an interior connector to releasably connect to the base of the filament.

9. The kit of claim 1, wherein the first tube further includes a first set of parallel ridges extending outward from the first tube with each of the ridges in a plane orthogonal to the longitudinal axis, the first set of ridges each extending less than half way around the first tube; a second set of parallel ridges extending outward from the first tube with each of the ridges in a plane orthogonal to the longitudinal axis, the second set of ridges each extending less than half way around the first tube and located on an opposing side of the first tube than the first set of ridges, the first and second ridges having ends spaced apart to define first and second longitudinal channels on opposing sides of the first tube.

10. The kit of claim 9, wherein the first tube further comprises a first set of visible indicia adjacent a plurality of the first set of ridges defining a distance from the bottom of the base to the visible indicia associated with each of the plurality of the first set of ridges.

11. The kit of claim 10, wherein the first tube further comprises a second set of visible indicial adjacent a plurality of the second set of ridges defining a distance from the bottom of the base to the visible indicia associated with each of the plurality of the second set of ridges, wherein at least one of the first and second set of indicia is a distance specified in metric or English distance units.

12. A kit for forming a tubular passage through a poured concrete deck, comprising:
  a base having a cylindrical sidewall portion extending along a longitudinal axis and containing a ring of intumescent material adjacent the cylindrical sidewall portion, the ring of intumescent material encircling the longitudinal axis;
  a flexible diaphragm seal having a central opening selected to seal against a range of pipe diameters during use, the seal having a funnel portion between an outer periphery and the central opening, with the funnel portion having a sidewall forming the central opening which sidewall is curved in cross-section toward the longitudinal axis and forms a circle of revolution; and
  a first cylindrical tube configured to fasten to a top of the base assembly during use and encircle the longitudinal axis during use, the first tube and base being configured to clamp a periphery of the flexible diaphragm between them.

13. The kit of claim 12, wherein the funnel portion has a curved sidewall.

14. The kit of claim 12, wherein the first tube has a plurality of outwardly extending, equally spaced ridges on an exterior surface thereof and extending along a majority of a length of the first tube and extending less than a majority of a circumference of the first tube.

15. The kit of claim 14, further including a first cylindrical extension tube having a first end configured to fit over the first tube and having at least one lug configured to engage a selected one of the plurality of outwardly extending ridges to releasably fasten the first extension tube to the first tube.

16. The kit of claim 12, wherein the first cylindrical tube has a plurality of outwardly extending, equally spaced ridges on an exterior surface thereof and extending along a majority of a length of the first cylindrical tube, and further including a cap sized to close a distal end of the first cylindrical tube, the cap having a skirt with an inner surface configured to releasably engage the ridges.

17. The kit of claim 14, further including a cap for a distal end of the first cylindrical tube, the cap having an exterior surface facing along the longitudinal axis, and further including a flexible filament having a base and a length of about one to several inches long, the cap having an exterior surface facing along the longitudinal axis and containing a recess within which is a connector releasably receiving the base of the filament within the recess during use of the filament.

18. The kit of claim 17, wherein the cap has a cap skirt having an inner surface configured to releasably engage the ridges and has an outer surface configured to releasably engage an inward facing surface of a cylindrical extension tube during use.

19. The kit of claim 12, wherein the base has a base mounting flange extending outward from the base at a bottom end of the base.

20. The kit of claim 12, further including at least one stabilizing plate releasably connectable to a base mounting flange extending outward from the base.

21. The kit of claim 12, further including a cap for a distal end of the first cylindrical tube, the cap having an exterior surface facing along the longitudinal axis and an opposing interior facing surface, the kit further including a flexible filament having a base and a length of about one to several inches long, the cap having a recess in the exterior surface of the cap containing a connector to releasably connect to the base of the filament within the recess, the cap having a projection extending from the interior surface of the cap forming an interior connector to releasably connect to the base of the filament.

22. The kit of claim 12, wherein the first tube further includes a first set of parallel ridges extending outward from the first tube with each of the ridges in a plane orthogonal to the longitudinal axis, the first set of ridges each extending less than half way around the first tube; a second set of parallel ridges extending outward from the first tube with each of the ridges in a plane orthogonal to the longitudinal axis, the second set of ridges each extending less than half way around the first tube and located on an opposing side of the first tube than the first set of ridges, the first and second ridges having ends spaced apart to define first and second longitudinal channels on opposing sides of the first tube.

23. The kit of claim 22, wherein the first tube further comprises a first set of visible indicia adjacent a plurality of the first set of ridges defining a distance from the bottom of the base to the visible indicia associated with each of the plurality of the first set of ridges.

24. The kit of claim 23, wherein the first tube further comprises a second set of visible indicial adjacent a plurality of the second set of ridges defining a distance from the bottom of the base to the visible indicia associated with each of the plurality of the second set of ridges, wherein at least one of the first and second set of indicia is a distance specified in metric or English distance units.

\* \* \* \* \*